United States Patent
Deligne et al.

(10) Patent No.: US 6,622,117 B2
(45) Date of Patent: Sep. 16, 2003

(54) EM ALGORITHM FOR CONVOLUTIVE INDEPENDENT COMPONENT ANALYSIS (CICA)

(75) Inventors: Sabine Deligne, White Plains, NY (US); Ramesh A. Gopinath, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 09/855,069

(22) Filed: May 14, 2001

(65) Prior Publication Data

US 2003/0046038 A1 Mar. 6, 2003

(51) Int. Cl.$^7$ .............................................. H04B 15/00
(52) U.S. Cl. .......................... 702/190; 702/66; 702/69; 702/111; 702/190; 708/5; 708/300; 708/308; 324/620; 324/624; 324/76.19; 324/76.29; 704/216; 704/219; 704/226; 704/240; 375/232
(58) Field of Search .................... 702/75–77, 124, 702/126, 111, 112, 66, 69, 70, 74, 179, 181, 183, 189–191, 193–195, 197, 199, FOR 103, 104, 107–110, 134, 139, 164, 166, 167, 168, 170, 171; 704/200, 201, 202, 203, 216, 217, 240, 246; 708/424, 426, 503, 505, 805, 806, 813, 815, 819, 821; 324/620, 624, 76.19, 76.21, 76.29; 375/229, 230, 232

(56) References Cited

U.S. PATENT DOCUMENTS

| | | | | | |
|---|---|---|---|---|---|
| 5,706,402 | A | * | 1/1998 | Bell | ............................ 395/23 |
| 2001/0037195 | A1 | * | 11/2001 | Acero et al. | ................. 704/200 |
| 2002/0042685 | A1 | * | 4/2002 | Balan et al. | .................... 702/75 |

OTHER PUBLICATIONS

Pearlmutter et al, Maximum Likelihood Blind Source Separation: A Context–Sensitive Generalization of ICA, 1998, IEEE press, pp. 1–7.*

P. Comon, "Independent component analysis, a new concept!", Signal Processing, Special issue on higher order statistics, pp287–314, vol. 36(3), 1994.

X.-R. Cao and R.-W. Liu, "General approach to blind source separation", IEEE Transactions on Signal Processing, pp562–571, vol. 44(3)m 1996.

J.-F. Cardoso, "Blind signal separation: statistical principles", Proceedings of the IEEE, pp 2009–2025, vol. 9, Oct. 1998.

H. Attias and C.E. Schreiner, "Blind source separation and deconvolution: the dynamic component analysis algorithm", Neural Computation, pp 1373–1424, vol. 10, 1998.

M.J.F. Gales, "Semi–tied covariance matrices for hidden Markov models", IEEE Transactions on Speech and Audio Processing, pp 272–281, num. 7, 1999.

S.S. Chen and R.A. Gopinath, "Gaussianization", Proceedings of the NISP conference, 2000.

A.P. Dempster and N.M. Laird and D.B. Rubin, "Maximum–Likelihood from Incomplete Data via the EM algorithm", Journal of the Royal Statistics Society, pp 1–38, vol. 39 (1), 1977.

S. Lawrence Marple, Jr., "Digital Spectral Analysis with Applications", Prentice Hall Signal Processing Series, Alan V. Oppenheim, Series Editor, 1987.

* cited by examiner

*Primary Examiner*—Marc S. Hoff
*Assistant Examiner*—Elias Desta
(74) *Attorney, Agent, or Firm*—Ference & Associates

(57) ABSTRACT

In connection with blind source separation, proposed herein, inter alia, are: expectation-maximization equations to iteratively estimate unmixing filters and source density parameters in the context of convolutive independent component analysis where the sources are modeled with mixtures of Gaussians; a scheme to estimate the length of unmixing filters; and two alternative initialization schemes.

31 Claims, 18 Drawing Sheets

MIXING FILTER $B_{21}(p)$, $P_B = 40$

VALUE OF THE AKAIKE INFORMATION CRITERION
AS A FUNCTION OF THE POSTULATED LENGTH
OF THE UNMIXING FILTERS

ESTIMATED VARIANCES OF THE GAUSSIAN COMPONENTS IN THE GAUSSIAN MIXTURE OF THE SECOND SOURCE AGAINST THE NUMBER OF ITERATIONS; THE ACTUAL VALUE ARE +1, +1 AND +1

EM ALGORITHM FOR CONVOLUTIVE INDEPENDENT COMPONENT ANALYSIS (CICA)

FIELD OF THE INVENTION

The present invention generally relates to blind source separation. More particularly, it relates to the blind separation of convolutive mixtures of mutually independent white sources.

BACKGROUND OF THE INVENTION

Blind Source Separation (BSS) addresses the issue of recovering source signals from the observation of linear mixtures of these sources. Independent Component Analysis (ICA) aims at achieving BSS in the case where the source signals are mutually statistically independent and mixed with an unknown full rank matrix, resulting in distinct instantaneous mixtures observed at the outputs of sensors. However, in most real-world situations, the assumption of instantaneous mixing between the sources does not hold, due to propagation delays and multipath propagation in reflective environments. It is more realistic to expect multiple attenuated echoes of the source signals to arrive at the sensors at different times. This situation can be modeled by assuming that the source signals are mixed with an unknown matrix of filters (instead of scalars), resulting in distinct convolutive mixtures observed at the outputs of the sensors.

The BSS of convolutive mixtures may be referred to as Convolutive ICA (CICA). So far, the algorithms devised to solve the CICA problem rely on gradient descent techniques. It is well known that gradient descent techniques are slow and that they suffer from instability problems especially because they require the empirical tuning of a learning rate.

Generally, Independent Component Analysis (ICA) aims at achieving BSS in the case where the source signals are mutually statistically independent and mixed with an unknown full rank matrix, resulting in distinct instantaneous mixtures observed at the outputs of sensors. Usually, the algorithms devised to solve the ICA problem involve estimating an unmixing matrix transforming the observed mixtures into signals that are as independent as possible. This approach is grounded in theoretical results about blind identifiability according to which, assuming that no more than one source is Gaussian, then BSS can be achieved by restoring statistical independence (see: P. Comon, *Independent component analysis, a new concept?*, Signal Processing, Special Issue on higher-order statistics, pp 287–314, vol. 36(3), 1994; X. -R. Cao and R. -W. Liu, *General approach to blind source separation.*, IEEE Transactions on Signal Processing, pp 562–571, vol. 44(3), 1996; and J. -F. Cardoso, *Blind signal separation: statistical principles*, Proceedings of the IEEE, pp 2009–2025, vol.9, October 1998). As a consequence, the outputs of the unmixing matrix equal the actual sources up to scaling and permutation. In H. Attias and C. E. Schreiner, *Blind source separation and deconvolution*: the dynamic component analysis algorithm, Neural Computation, pp 1373–1424, vol. 10, 1998, an iterative procedure is proposed to learn Maximum Likelihood estimates of both the unmixing matrix and the densities of the sources, by modeling the distribution of each source with a mixture of Gaussians. Whereas the ML estimates of the density parameters are computed with the usual Expectation-Maximization equations for fitting mixtures of Gaussians, an ML estimate of the unmixing matrix is computed with gradient update rules. Recently, it was shown by S. Chen and R. Gopinath, as a by-product of their work on Gaussianization (S. S. Chen, and R. A. Gopinath. *Gaussianization*, Proceedings of the NIPS conference, 2000), that EM equations could be derived not only to compute the estimates of the density parameters, but also to compute an ML estimate of the unmixing matrix.

Convolutive ICA (CICA) aims at achieving BSS in the case where the source signals are mutually statistically independent and mixed with an unknown matrix of filters, resulting in distinct convolutive mixtures observed at the outputs of sensors. In Attias et al., supra, an iterative procedure is proposed to learn Maximum Likelihood estimates of both the unmixing filters and the densities of the sources, by modeling the distribution of each source with a mixture of Gaussians. Whereas the ML estimates of the density parameters are computed with the usual Expectation-Maximization equations for fitting mixtures of Gaussians, ML estimates of the unmixing filters are computed with gradient update rules.

In view of the foregoing, a need has been recognized in connection with overcoming the shortcomings and disadvantages presented in connection with conventional arrangements.

SUMMARY OF THE INVENTION

In accordance with at least one presently preferred embodiment of the present invention, the EM (Expectation-Maximization) solution provided for ICA is extended to the case of Convolutive ICA, where a matrix of filters, instead of a matrix of scalars, needs to be estimated. The EM equations proposed by S. Chen and R. Gopinath to solve the ICA problem is a particular case that can be addressed, where the filters would be of length 1.

Broadly contemplated herein is the replacement of gradient update rules (discussed heretofore) with Expectation-Maximization (EM) equations. The use of an EM procedure is advantageous as it provides a faster and more stable convergence than gradient descent techniques.

Addressed herein is the issue of separating convolutive mixtures of white independent sources. The model assumed by the invention is as follows. Consider D mutually independent random variables $Y_1 \ldots Y_D$ called sources and generating real-valued data $Y_1(t) \ldots Y_d(t) \ldots Y_D(t)$ at each time index t. Further assume that each source $Y_d$ obeys a statistical law, i.e. samples are drawn according to a density probability function consisting of a mixture of $l_d$ Gaussians characterized by the unknown prior, mean and variance parameters $\{(\pi_{d,1}, \mu_{d,1}, \sigma_{d,1}^2)_{i=1}^{I_d}, d=1 \ldots D\}$. The T observations $Y_d(1) \ldots Y_d(t) \ldots Y_d(T)$ generated by each source $Y_d$ are assumed to be drawn independently, i.e. each source is assumed to be white. The D streams of data generated by the sources are not observable. They are mixed with an unknown D×D matrix of filters, resulting in D streams of data $X_1(t) \ldots X_d(t) \ldots X_D(t)$ which are observed at the output of D sensors. The present invention provides an EM algorithm to compute:

maximum likelihood estimates of the unknown density parameters $$\{(\pi_{d,i}, \mu_{d,i}, \sigma_{d,i}^2)_{i=1}^{I_d}, d=1 \ldots D\}$$

and a maximum likelihood estimate of the unknown D×D unmixing matrix of filters allowing to recover the unknown D sources (up to scaling and permutation), from the data $X_1(t) \ldots X_d(1) \ldots X_D(1)$ observed at the sensor outputs.

Also contemplated herein are two alternative initialization procedures of the algorithm that allow:

estimation of the length of the unmixing filters (assuming that the unmixing filters are of finite length), speeding up of the convergence and limiting of the risk of converging towards a local maximum of the likelihood.

In summary, one aspect of the present invention provides a method of facilitating blind source separation in convolutive independent component analysis, the method comprising the steps of: initializing at least one parameter, obtaining a set comprising at least one observation; computing the likelihood of the at least one observation and of an auxiliary function; maximizing the auxiliary function; and ascertaining whether the likelihood of the at least one observation converges.

A further aspect of the present invention provides an apparatus for facilitating blind source separation in convolutive independent component analysis, the apparatus comprising: an initializing arrangement which initializes at least one parameter; an input arrangement which obtains a set comprising at least one observation; a likelihood computing arrangement which computes the likelihood of the at least one observation and of an auxiliary function; a maximizing arrangement which maximizes the auxiliary function; and an ascertain arrangement which ascertains whether the likelihood of the at least one observation converges.

Furthermore, an additional aspect of the present invention provides a program storage device readable by machine, tangibly embodying a program of instructions executable by the machine to perform method steps for facilitating blind source separation in convolutive independent component analysis, the method comprising the steps of: initializing at least one parameter; obtaining a set comprising at least one observation; computing the likelihood of the at least one observation and of an auxiliary function; maximizing the auxiliary function; and ascertaining whether the likelihood of the at least one observation converges.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Generally, at least one presently preferred embodiment of the present invention relates to:

EM equations to iteratively estimate un-mixing filters and source density parameters in the context of Convolutive ICA where the sources are modeled with mixtures of Gaussians, a scheme to estimate the length of the un-mixing filters, and two alternative schemes to initialize the algorithm.

The disclosure will now address the derivation of EM estimation equations.

Figure 1:
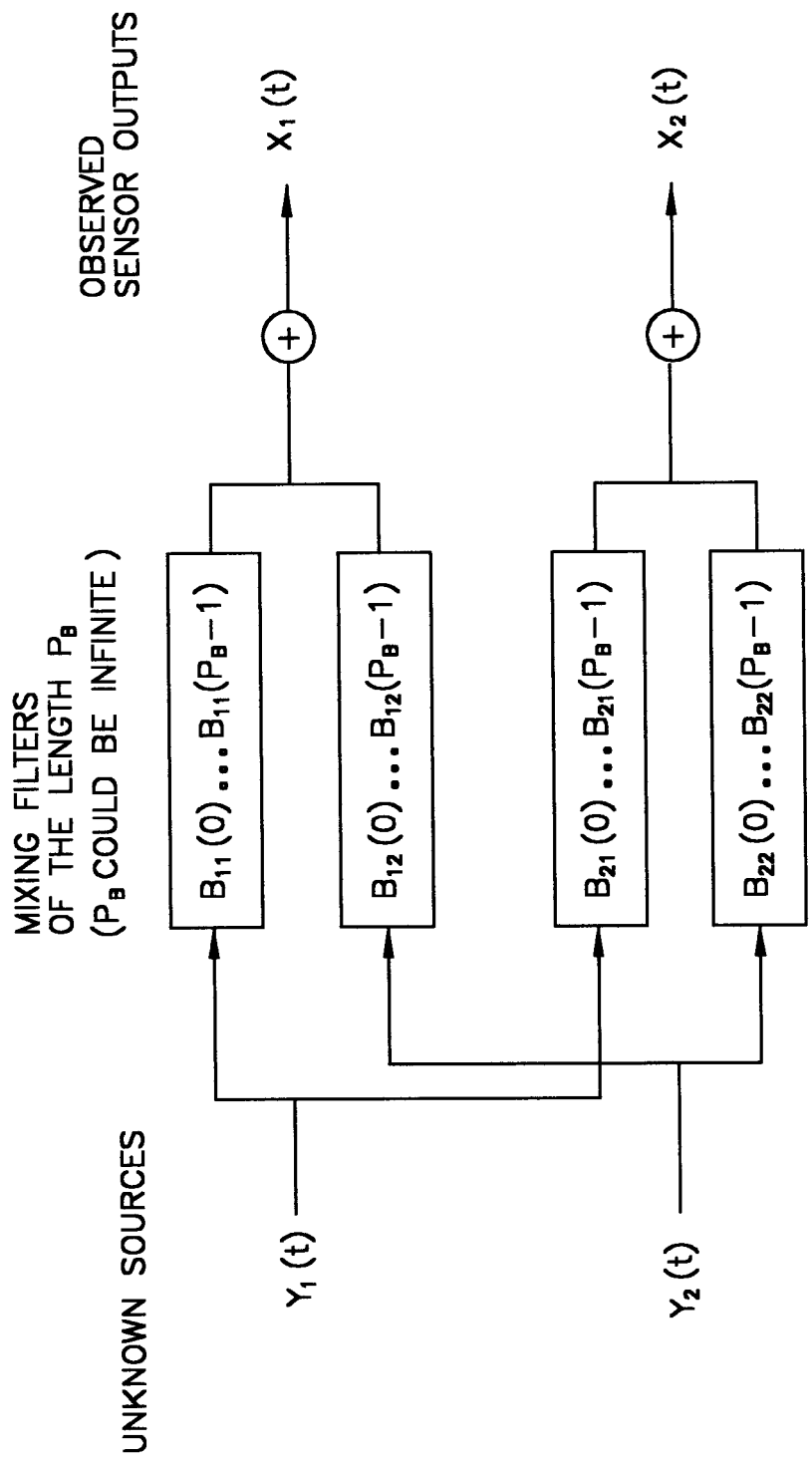
FIG. 1 shows the model of the observation data assumed by Convolutive ICA.

Referring to the drawings, FIG. 1 shows the model of generation of the observed data assumed in at least one embodiment of the present invention. D mutually independent random variables $Y_1 \ldots Y_d \ldots Y_D$ called sources generate real-valued data $Y_1(t) \ldots Y_d(t) \ldots Y_D(t)$ at each time index t. The T observations $Y_d(1) \ldots Y_d(t) \ldots Y_d(T)$ generated by each source $Y_d$ are assumed to be drawn independently, i.e. each source is assumed to be white. The D streams of data generated by the sources are not observable. They are mixed with unknown convolutive filters of finite impulse response $(B_{dj})_{dj=1}^D$, as shown on FIG. 1. The filtering and mixing process results in D streams of data $X_1(t) \ldots Y_d(t) \ldots X_D(t)$. which are observed at the output of D sensors:

$$X_d(t) = \sum_{j=1}^{D} (B_{dj} * Y_j)(t) = \sum_{j=1}^{D} \sum_{p=0}^{P_B-1} B_{dj}(p) Y_j(t-p) \quad (1)$$

where the symbol * denotes the convolution operation and where $P_B$ is the maximum of the lengths ($P^B$ can actually be infinite) of all the filters $(B_{dj})_{dj=1}^D$.

Figure 2:
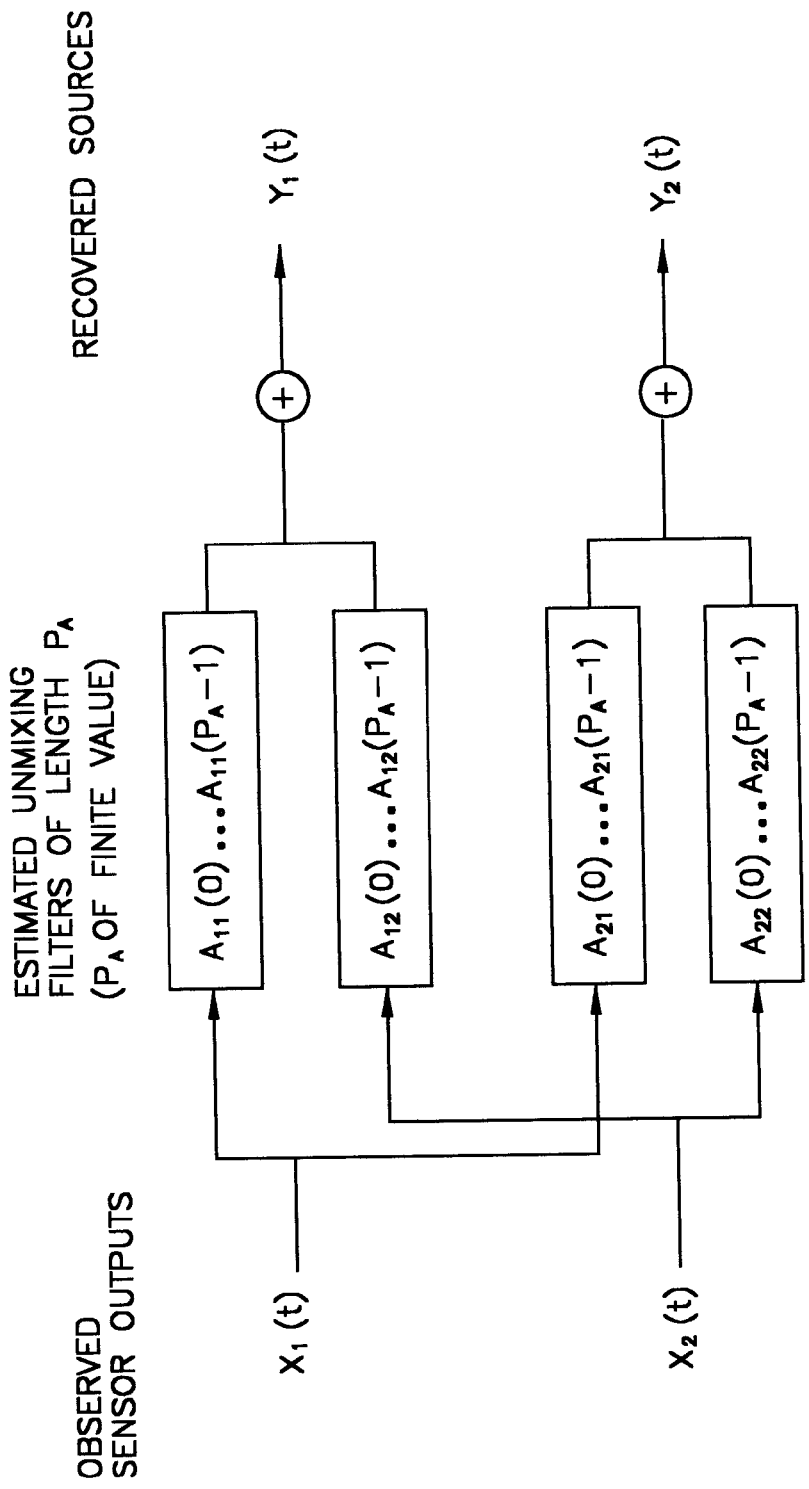
FIG. 2 shows the unmixing model that a CICA algorithm aims at learning.

A basic problem addressed in accordance with an embodiment of the present invention is to identify a D×D matrix A of inverse filters with responses $(A_{ij})_{i,j=1}^D$ allowing to recover D mutually independent sources $\acute{Y}_1 \ldots \acute{Y}_1 \ldots \acute{Y}_D$ from the observed convolutive mixtures $X_1(t) \ldots X_d(t) \ldots Y_D(t)$, as shown in FIG. 2, and as formally expressed by the following equation:

$$\acute{Y}_d(t) = \sum_{j=1}^{D} (A_{dj} * X_i)(t) = \sum_{j=1}^{D} \sum_{p=0}^{P_A-1} A_{dj}(p) X_i(t-p) \quad (2)$$

where $P^A$ is the maximum of the lengths of all the filters $(A_D)_{i,j=1}^D; P_d$ has to be finite.

Note the assumption that there are no time correlations within each source, i.e. one assumes that each source is white. This assumption does not narrow the applicability of our solution to blind CICA, since, as emphasized in Attias et al., supra, it is not possible in the filly blind separation problem to distinguish between the spectra of the filters and the spectra of the sources. Therefore, one can as well assume that the time structure within each observed mixture is introduced exclusively by the convolutive aspect of the mixing. In that case, learning the separating transform means learning the spectra of the filters and recovering white sources.

It remains to clarify the relation between the recovered sources $\acute{Y}_1 \ldots \acute{Y}_d \ldots \acute{Y}_D$ and the actual sources $Y_1 \ldots Y_d \ldots Y_D$. For this purpose, one may rewrite matricially equation (2), as a product of the convolutive mixtures by a TD×TD separating matrix:

$$\begin{bmatrix} \acute{Y}(1) \\ \acute{Y}(2) \\ \cdots \\ \acute{Y}(t) \\ \cdots \\ \cdots \\ \acute{Y}(T) \end{bmatrix} = \begin{bmatrix} A(0) & 0_D & \cdots & & & & & \\ A(1) & A(0) & 0_D & \cdots & & & & \\ \cdots & & & & & & & \\ & \cdots & 0_D & A(P_A-1) & \cdots & A(0) & 0_D & \cdots \\ & & & \cdots & 0_D & A(P_A-1) & \cdots & A(0) & 0_D \\ & & & & \cdots & 0_D & A(P_A-1) & \cdots & A(0) \end{bmatrix} \begin{bmatrix} X(1) \\ X(2) \\ \cdots \\ X(t) \\ \cdots \\ \cdots \\ X(T) \end{bmatrix} \quad (3)$$

where $$A(p) = \begin{bmatrix} A_{11}(p) & A_{12}(p) \\ A_{21}(p) & A_{22}(p) \end{bmatrix}$$

is the D×D matrix of scalars formed by the $p^{th}$ coefficients of the separating filters, and where $0_D$ is the D×D matrix of zeros.

One may note from equation (3) that the CICA problem is formally equivalent to an ICA problem with $P_A D$ sensor outputs since:

$$\acute{Y}(t)=[A(0) \ldots A(P_A-1)]X(t) \quad (4)$$

with $$X(t)=[X_1(t) \ldots X_D(t) \ldots X_1(t-P_A+1) \ldots X_D(t-P_A+1)],$$

i.e., the $P_A D$ observations X are composed of the D current observations $X_1(t) \ldots X_D(t)$ and of the $(P_A-1)$ delayed versions of the D sensor outputs. As it is well known in ICA, the recovered sources $\acute{Y}_1 \ldots \acute{Y}_d \ldots \acute{Y}_D$ equal the actual sources $Y_1 \ldots Y_d \ldots Y_D$ up to scaling and permutation. In the case of CICA, equation (4) shows that the ambiguity on the scale of the sources can be solved by requiring to find a solution $[A(0) \ldots A(P_A-1)]$ where each $1 \times P_A D$ row has a norm equal to 1. All that remains then is the ambiguity on the order of the sources, i.e. the ambiguity on the order of the rows in $[A((1) \ldots A(P_A-1)]$.

It should be noted that by writing the matricial equation (3), it has been implicitly assumed that the TD×TD mixing matrix was invertible, which implies especially that the matrix A(0) is full rank. This may not be the case in real applications, however, the scheme presented in this application does not cover such cases.

Besides, in the present invention, following the approach in Attias et al., supra, the density of each source $Y_d$ is modeled with a mixture of $l_d$ Gaussians characterized by the unknown prior, mean and variance parameters $(\pi_{d,1}, \mu_{d,i}, \sigma_{d,i}^2)_{i=1}^{I_d}$, where $l_d$ is the prespecified number of Gaussian components in the density of $Y_d$. The CICA model is thus fully specified by the set of parameters $\Theta=\{A(p)_{p=0}^{P_A-1}; (\pi_{d,l}, \mu_{d,l}, \sigma_{d,l}^2)_{i=1}^{I_d}, d=1 \ldots D\}$. In the remaining of this section, we derive EM equations to compute Maximum Likelihood (ML) estimates for all the parameters in the set $\Theta$.

The problem of computing ML estimates of $\Theta$ can be formulated as an ML estimation problem from incomplete data, where the missing data are the gaussian components drawn for each $Y_d$, and as such it can be solved with an Expectation-Maximization procedure (see A. P. Dempster, N. M. Laird and D. B. Rubin, *Maximum-Likelihood from Incomplete Data via the EM algorithm*, Journal of the Royal Statistics Society, pp 1–38, vol. 39 [1], 1977). The complete data are given by (X,Z), where the random variable $Z=[Z_1 \ldots Z_D]$ is such that $Z^d(1)$ specifies the index i of the Gaussian $(\pi_{d,1}, \mu_{d,i}, \sigma_{d,i}^2)$ drawn for $Y_d(t)$. The likelihood of the complete data computed with the parameter set $\Theta$ is given by the joint density $P_\Theta (X,Z)$. Following the EM framework, one may define the auxiliary function Q ($\Theta'$, $\Theta$) to be the conditional expectation of the log-likelihood of the complete data (X, Z).

$$Q(\Theta',\Theta)=E(\log p_\Theta(X,Z)|\Theta', X) \quad (5)$$

According to the Baum-Welch inequality, if $Q(\Theta', \Theta) \geq Q(\Theta', \Theta')$ then $P_\Theta (X) \geq p_{\Theta'}(X)$. The E-step of the EM procedure consists in computing $Q(\Theta', \Theta)$ and the M-step consists in maximizing Q ($\Theta'$, $\Theta$) with respect to $\Theta$. To perform the E-step, we express the complete data likelihood as a function of the source densities:

$$p_\Theta(X,Z)=|\det A(0)|^T p_\Theta(Y,Z)$$

where $|\det A(0)|^T$ is the determinant of the Jacobian of the separating transform as shown by equation (3).

Since the data Y are drawn independently at each time index and are composed of D mutually independent sources, the log likelihood can be written as:

$$\log p_\Theta(X, Z) = T\log|\det A(0)| + \quad (6)$$
$$\sum_{t=1}^{T}\sum_{d=1}^{D} \log p(Z_d(t)) + \log p(\acute{Y}_d(t) | Z_d(t))$$
$$= T\log|\det A(0)| +$$
$$\sum_{t=1}^{T}\sum_{d=1}^{D}\sum_{i=1}^{I_d} \delta_{Z_d(t),i}$$
$$\left[\log \pi_{d,i} - \frac{1}{2}\log 2\pi\delta_{d,i}^2 - \frac{(\acute{Y}_d(t) - \mu_{d,i})^2}{2\sigma_{d,i}^2}\right]$$

where the Kronecker variable $\delta_{Z_d}^{(t),i}$ equals 1 if $Z_d(t)=i$ and equals 0 otherwise.

From equations (5) and (6), one obtains:

$$Q(\Theta', \Theta) = T\log|\det A(0)| + \sum_{t=1}^{T}$$
$$\sum_{d=1}^{D}\sum_{i=1}^{I_d} \omega_{d,i}(t)\left[\log \pi_{d,i} - \frac{1}{2}\log 2\pi\sigma_{d,i}^2 - \frac{(\acute{Y}_d(t) - \mu_{d,i})^2}{2\sigma_{d,i}^2}\right]$$

where $U)_{d,i}(t)$ represents the occupancy probability of the Gaussian component (d,i) at time t;

$$\omega_{d,i}(t) = E[\delta_{Z_d(t),i} \mid \Theta', X] = \frac{\pi'_{d,i} \frac{1}{\sqrt{2\pi\sigma'^2_{d,i}}} \exp\left(\frac{(\acute{Y}_d(t) - \mu'_{d,i})^2}{2\sigma'^2_{d,i}}\right)}{\sum_{j=1}^{l_d} \pi'_{d,i} \frac{1}{\sqrt{2\pi\delta'^2_{d,i}}} \exp\left(\frac{(\acute{Y}_d(t) - \mu'_{d,i})^2}{2\sigma'^2_{d,i}}\right)}$$

In the M-step of the EM procedure, one may preferably derive reestimation equations for the parameters in $\Theta$ by maximizing the auxiliary function $Q(\Theta',\Theta)$ with th respect to $\Theta$. Zeroing the derivative of $Q(\Theta',\Theta)$ with respect to $\pi d,i$ and $\mu d,i$ yields the reestimation equations:

$$\pi_{d,j} = \frac{\sum_{t=1}^{T} \omega_{d,i}(t)}{T} \tag{7}$$

$$\mu_{d,i} = \frac{\sum_{t=1}^{T} \omega_{d,i}(t) \acute{Y}_d(t)}{\sum_{t=1}^{T} \omega_{d,i}(t)} = \sum_{p=0}^{P_A-1} a_d(p) \mu_{d,i}^{X(p)} \tag{8}$$

where $a_d(P)$ is the $d^{th}$ row vector of the matrix $A(P)$, and where, with the convention $X(t)=0$ for $t \leq 0$;

$$\mu_{d,i}^{X(p)} = \frac{\sum_{t=1}^{T} \omega_{d,i}(t) X(t-p)}{\sum_{t=1}^{T} \omega_{d,i}(t)}$$

Zeroing the derivative of $Q(\Theta',\Theta)$ with respect to $\sigma_{d,i}^2$ yields the reestimation equation.

$$\sigma_{d,i}^2 = \frac{\sum_{t=1}^{T} \omega_{d,i}(t)(\acute{Y}_d(t) - \mu_{d,i})^2}{\sum_{t=1}^{T} \omega_{d,i}(t)} = \sum_{p,p'=0}^{P_A-1} a_d(p) \sum_{d,i}^{X(p,p')} a_d^T(p') \tag{9}$$

where $$\sum_{d,i}^{Y(p,p')} = \frac{\sum_{t=1}^{T} \omega_{d,i}(t)\left(X(t-p) - \mu_{d,i}^{X(p)}\right)\left(X(t-p') - \mu_{d,i}^{X(p')}\right)^T}{\sum_{t=1}^{T} \omega_{d,i}(t)}$$

In Attias et al., supra, the maximization of $Q(\Theta',\Theta)$ with respect to the filter coefficients is performed with a gradient descent algorithm. In the present invention, we show how to derive EM reestimation equations for the rows $a_d(p)$ of the unmixing filters by following the scheme introduced in M. J. F. Gales, *Semi-tied covariance matrices for hidden Markov models*, IEEE Transactions on Speech and Audio Processing, pp 272–281, num. 7, 1999, for the derivation of semi-tied covariances, and used in Chen et al., supra, for Gaussianization. As will be seen, the ICA estimation equations derived in Chen et al., supra, are a special case of the equations derived in this section. One may rewrite $Q(\Theta',\Theta)$ as a function of the rows of to the filtering matrices using the fact that $\det A(0) = a_d(0) c_d^T(0)$ with $a_d(0)$ any particular row of $A(0)$ and $C_d^T(0)$ the row vector of the cofactors for the row $a^d(0)$;

$$Q(\Theta', \Theta) = T\log|a_d(0) c_d^T(0)| - \frac{1}{2}\sum_{t=1}^{T}\sum_{d=1}^{D}\sum_{i=1}^{l_d} \omega_{d,i}(t) \frac{\left(\acute{Y}_d(t) - \mu_{d,i}\right)^2}{\sigma_{d,i}^2} + K$$

$$= T\log|a_d(0) c_d^T(0)| - \frac{1}{2}\sum_{d=1}^{D}\sum_{p,p'=0}^{P_d-1} a_d(p) G_d(p, p') a_d^T(p') + K$$

where $$G_d(p, p') = \sum_{i=1}^{l_d} \frac{1}{\sigma_{d,i}^2} \sum_{t=1}^{T} \omega_{d,i}(t)\left(X(t-p) - \mu_{d,i}^{X(p)}\right)\left(X(t-p') - \mu_{d,i}^{X(p')}\right)^T$$

The derivative of $Q(\Theta',\Theta)$ with respect to $a_d(p)$ for $P \neq 0$ is:

$$\frac{\partial Q}{\partial a_d(p)}(\Theta', \Theta) = -a_j(p) G_d(p, p) - \sum_{r \neq p} a_d(r) G_d(r, p)$$

where the equality $G_d(p,p') = G_d(p',p)^T$ is used. Zeroing t is derivative yields the reestimation equation:

$$a_d(p) = -\left[\sum_{r \neq p} a_d(r) G_d(r, p)\right] G_d^{-1}(p, p) \text{ for any } p \neq 0 \tag{10}$$

Similarly, the derivative of $Q(\Theta', \Theta)$ with respect to $a^d(0)$ is $$\frac{\partial Q}{\partial a_d(0)}(\Theta', \Theta) = T\frac{c_d(0)}{a_d(0) c_d^T(0)} - a_d(0) G_d(0, 0) - \sum_{r \neq 0} a_d(r) G_d(r, 0)$$

Zeroing this derivative can be written as a quadratic equation of the scalar variable $$\beta = \frac{T}{a_d(0) c_d^T(0)} :$$

$$\varepsilon_1 \beta^2 - \varepsilon_2 \beta - T = 0 \tag{11}$$

where $$\varepsilon_1 = c_d(0) G_d^{-1}(0, 0) c_d^T(0)$$

$$\varepsilon_2 = \left(\sum_{r \neq 0} a_d(r) G_d(r, 0)\right) G_d^{-1}(0, 0) c_d^T(0)$$

The two roots of this quadratic equation, $$\beta = \frac{\varepsilon_2 \pm \sqrt{\varepsilon_2^2 + 4\varepsilon_1 T}}{2\varepsilon_1},$$

both correspond to maxima (note that from the definition of $\epsilon_1$, the quantity $\epsilon_2^2 + 4\epsilon_1 T$ is always positive, and hence the roots have real values). The root to select is thus the one which will yield the highest value of $Q(\Theta', \Theta)$. Substituting the reestimation equation of $a_d(0)$;

$$a_d(0) = \left(\beta c_d(0) - \sum_{r \neq 0} a_d(r) G_d(r, 0)\right) G_d^{-1}(0, 0) \tag{12}$$

into $Q(\Theta', \Theta)$ and keeping only the terms depending on $\beta$;

$$Q(\Theta', \Theta) = T\log|\beta \varepsilon_1 - \varepsilon_2| - \frac{1}{2}\varepsilon_1 \beta^2$$

-continued $$= T\log\left|\frac{-\varepsilon_2 \pm \sqrt{\varepsilon_2^2 + 4\varepsilon_1 T}}{2}\right| - \frac{1}{2}\varepsilon_1\left(\frac{\varepsilon_2 \pm \sqrt{\varepsilon_2^2 + 4\varepsilon_1 T}}{2\varepsilon_1}\right)^2$$

Therefore if $\varepsilon_2 \geq 0$, one may preferably select $$\beta = \frac{\varepsilon_2 - \sqrt{\varepsilon_2^2 + 4\varepsilon_1 T}}{2\varepsilon_1},$$

whereas if $\varepsilon_2 < 0$, one may select $$\beta = \frac{\varepsilon_2 + \sqrt{\varepsilon_2^2 + 4\varepsilon_1 T}}{2\varepsilon_1}.$$

After proper selection of $\beta$, the row a $a_d(0)$ is reestimated with equation (12).

The estimation equations of the transform rows in Chen et al., supra, are special cases of the estimation equations (10) and (12). To make it more precise, by taking $P_A=1$, equations (10) and (12) reduce to the ICA estimation equations in Chen et al., supra.

The disclosure now turns to the initialization of an algorithm in accordance with at least one presently preferred embodiment of the present invention.

One limitation of the EM algorithm is that it may converge towards a local maximum instead of the global maximum of the likelihood function. A judicious choice of the initial estimates can limit the risk of converging towards a steady point of the likelihood function that would be very far away from the global optimum. Besides, it is known that proper initialization can also speed up the convergence process, requiring fewer iterations. The existing experimental works in ICA show that whitening the observations usually allows a faster convergence towards independent sources. The idea is that decorrelating the data is an initial move towards a sensible direction before seeking for mutual independence. Therefore a transform decorrelating the observations can be expected to provide a good initial guess for the unmixing matrix. For example, the inverse square root of the covariance matrix of the observations $(E(XX^T)^{-1/2})$ is a transform that is often used in ICA to initialize the unmixing matrix (the covariance matrix of the transformed data $E(XX^T)^{-1/2}X$ is the DxD identity matrix).

Discussed herebelow is an initialization scheme for the case of CICA, so that all unmixing matrices $A(0) \ldots A(P_A-1)$ can be assigned adequate initial values. As shown by equation (4), the CICA problem is formally equivalent to an ICA problem with $P_A D$ observed variables, denoted by the vector X: the D current observations at the output of the D sensors and $(P_A-1)$ delayed versions of the D sensor outputs:

$$X(t) = [X_1(t) \ldots X_1, (t) \ldots X_j(t-P_A+1) \ldots X_D(t-P_A+1)]^T$$

A natural extension of the ICA initialization scheme is thus to initialize the unmixing matrices $A(0) \ldots A(P_A-1)$ with a transform decorrelating the vector X, i.e. decorrelating the observations X both spatially and temporally (over a window of $P_A$ samples). In other words, the issue is to find a transform $\Gamma$ such that the covariance matrix of the transformed data $\Gamma X$ is diagonal. A straightforward way would be to compute $\Gamma$ as the inverse of the Cholesky factorization of the $P_A D \times P_A D$ covariance matrix $E(XX^T)$ (the Cholesky factorization of $E(XX^T)$ produces a lower triangular matrix C such that $CC^T = E(XX^T)$, so that by choosing $\Gamma = C^{-1}$, it comes that the covariance matrix $\Gamma E(XX^T \Gamma^T)$ of the data $\Gamma X$ equals the identity matrix). However, in accordance with an embodiment of the present invention, a computationally more efficient procedure is proposed that avoids the factorization and inversion of a $P_A D \times P_A D$ matrix.

One principle of an initialization procedure according to an embodiment of the present invention is to compute $\Gamma$ as $\Gamma = \Gamma_1 \Gamma_2$ where $\Gamma_1$ is a transform such that the covariance matrix of the transform data $\Gamma_{1X}$ is block-diagonal of block dimension DxD, (i.e. $\Gamma_1$ decorrelates the data X over the time index) and where $\Gamma_2$ is a transform such that the covariance matrix of the transformed data $\Gamma_2(\Gamma_{1X})$ is diagonal (i.e. $\Gamma_2$ decorrelates the data $\Gamma_{1X}$ over the component index d=1, ... D):

computation of $\Gamma_1$: as a time-decorrelating transform, $\Gamma_1$ can be computed as the multichannel linear prediction coefficients at the order $P_A$ of the observed data X. It can be estimated by recursively solving the multichannel Yule-Walker equations up to order $P_A$:

$$[\Gamma_1(0) \ldots \Gamma_1(P_A-1)]E(XX^P) = [\epsilon_{P_A}, 0 \ldots 0]$$

where the covariance matrix $E(XX^T)$ is a $P_A D \times P_A D$ block-Toeplitz matrix of block dimension DxD,
where $\epsilon_{P^A}$ is the DxD covariance matrix of the forward prediction error output by the linear prediction filter $[\Gamma_1(0) \ldots \Gamma_1(P_A-1)]$ with X, input Several algorithms were proposed in the field of multichannel autoregressive spectral estimation to solve the multichannel Yule-Walker equations (chapter 15, in S. Lawrence Marple, Jr., *Digital Spectral Analysis with Applications*, Prentice Hall Signal Processing Series, Alan V. Oppenheim, Series Editor, 1987). Experiments were carried out with the multichannel Levinson algorithm, but other algorithms that were proposed in the field could be used.

computation of $\Gamma_2$: after the transform $\Gamma_1$ is computed by solving the multichannel Yule-Walker equations, the transform $\Gamma_2$ can be computed as a DxD transform diagonalizing the covariance matrix $\epsilon_{P_A}$. In the evaluation of the present invention, it is computed as the inverse of the Cholesky factorization of $\epsilon_{P_A}$ (the Cholesky factorization of $\epsilon_{P_A}$ produces a lower triangular matrix C such that $CC^T \epsilon_{P_A}$, so that by choosing $\Gamma_2 = C^{-1}$, it comes that the covariance matrix $\Gamma_2 \epsilon_{P_A} \Gamma_2^T$ equals the identity matrix).

Figure 4A:
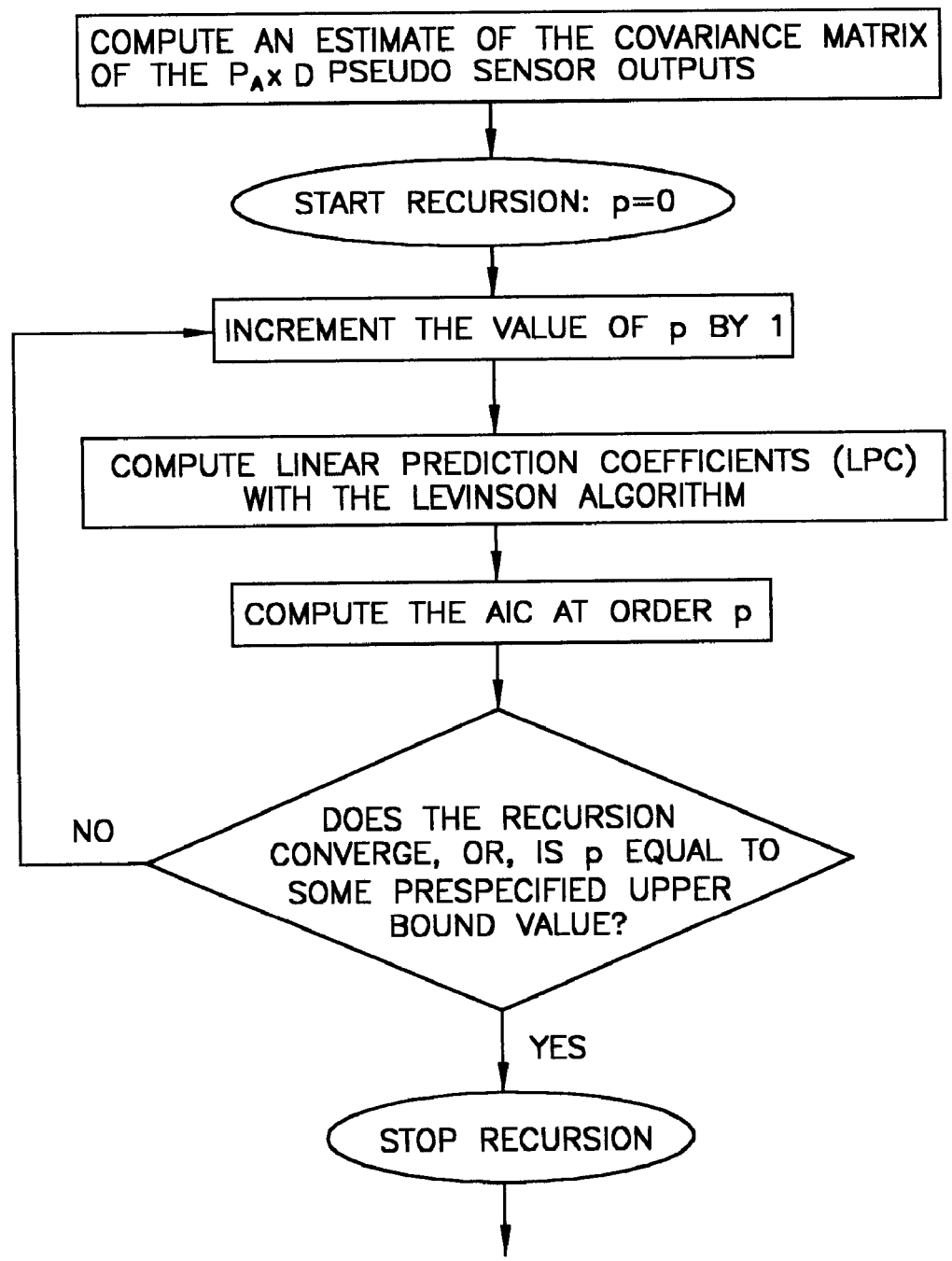
FIG. 4a and 4b summarize two initialization schemes.
Figure 4B:
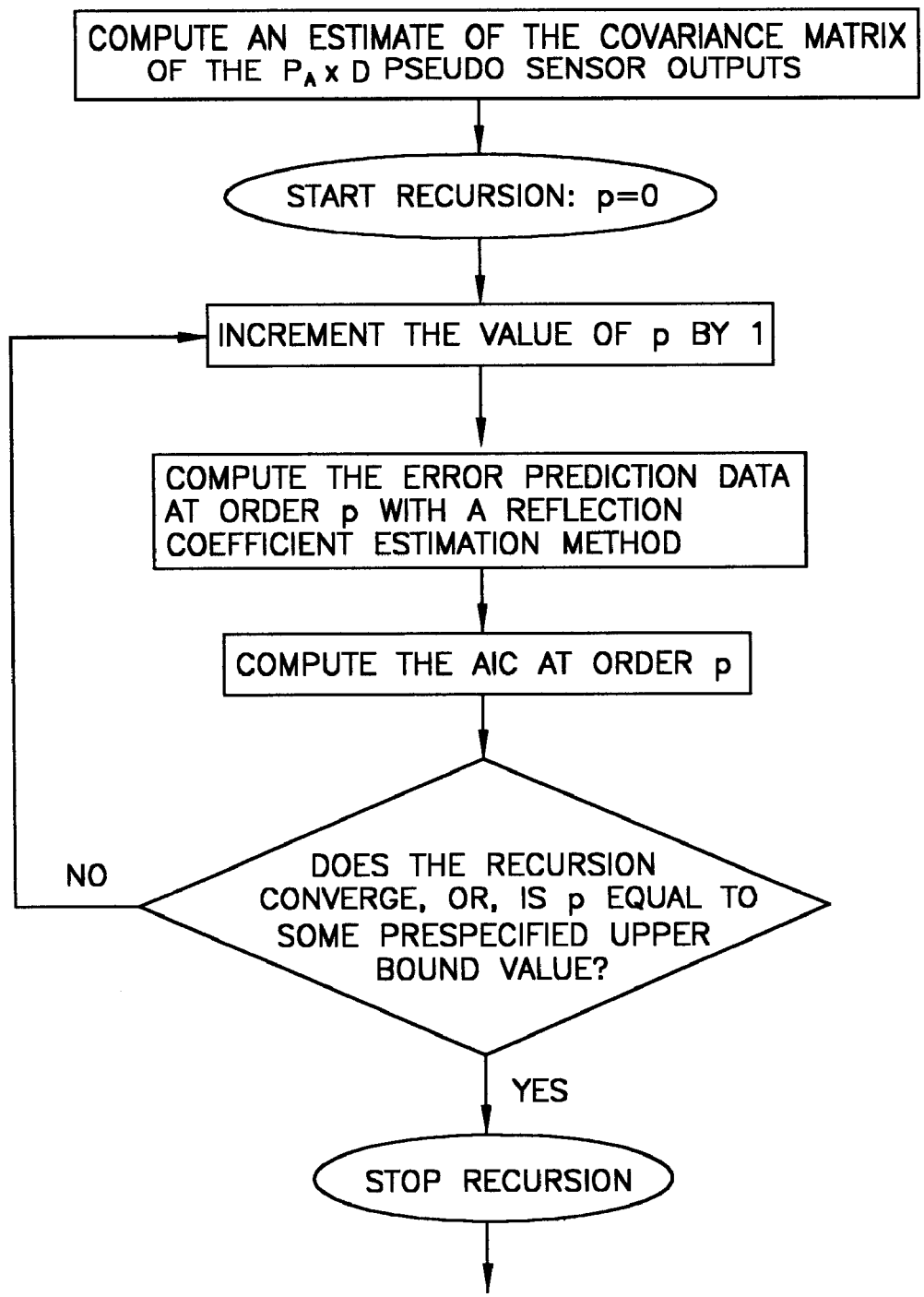
Figure 5:
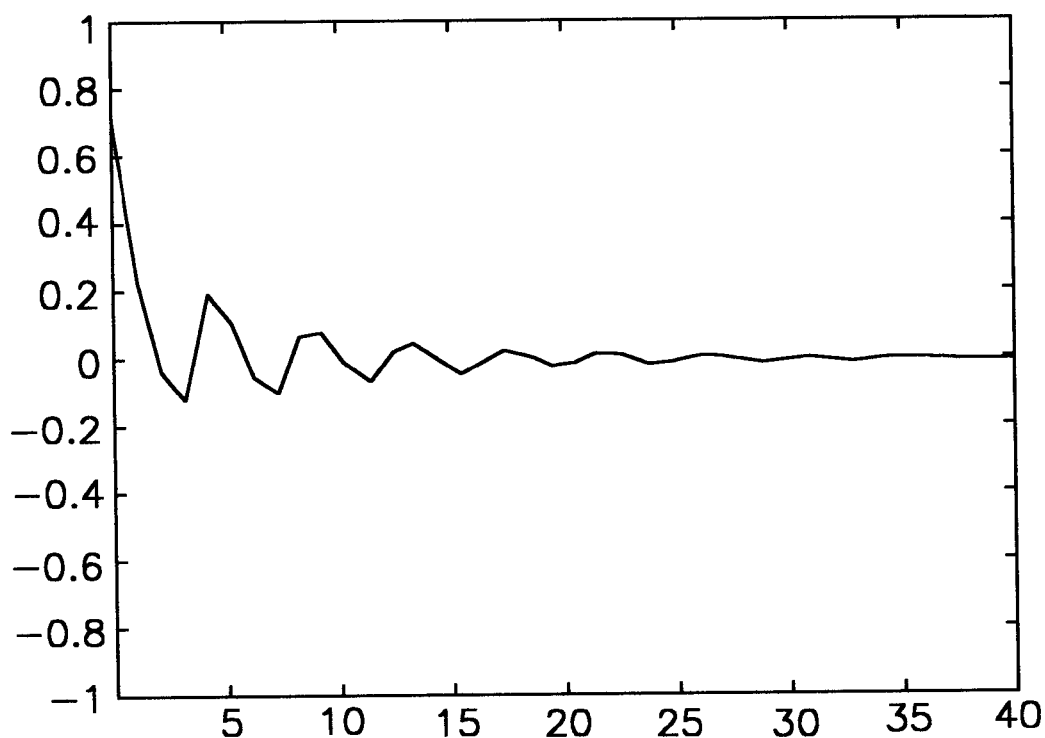
FIGS. 5 through 8 show the impulse responses of mixing filters used in experiments.
Figure 6:
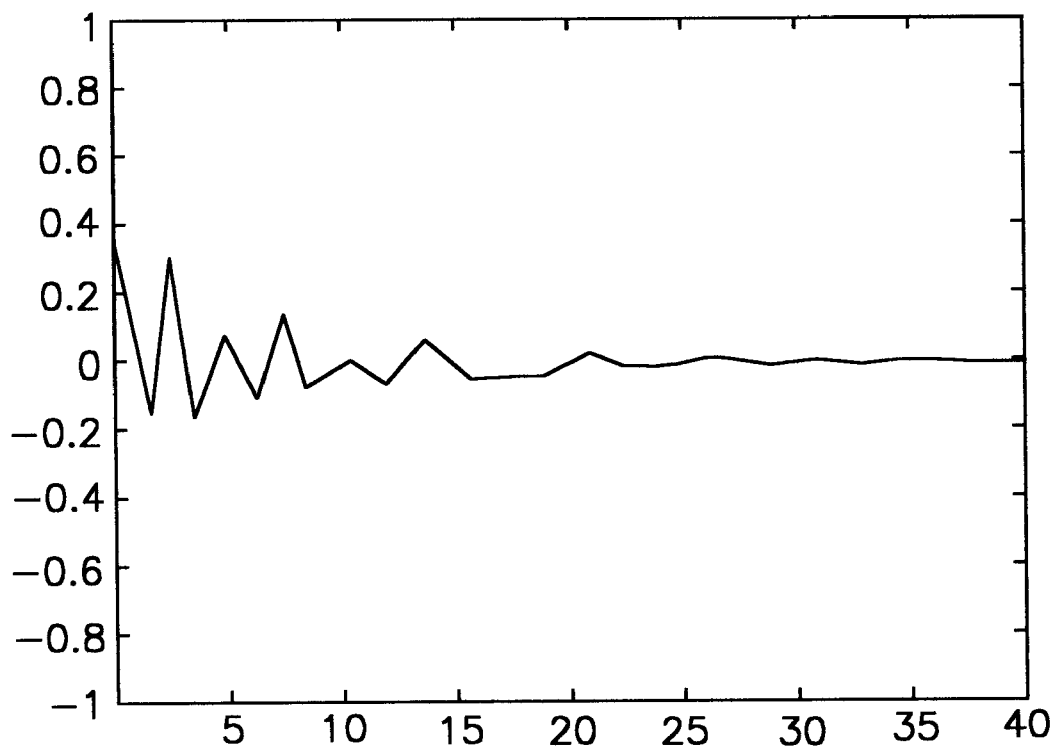
Figure 7:
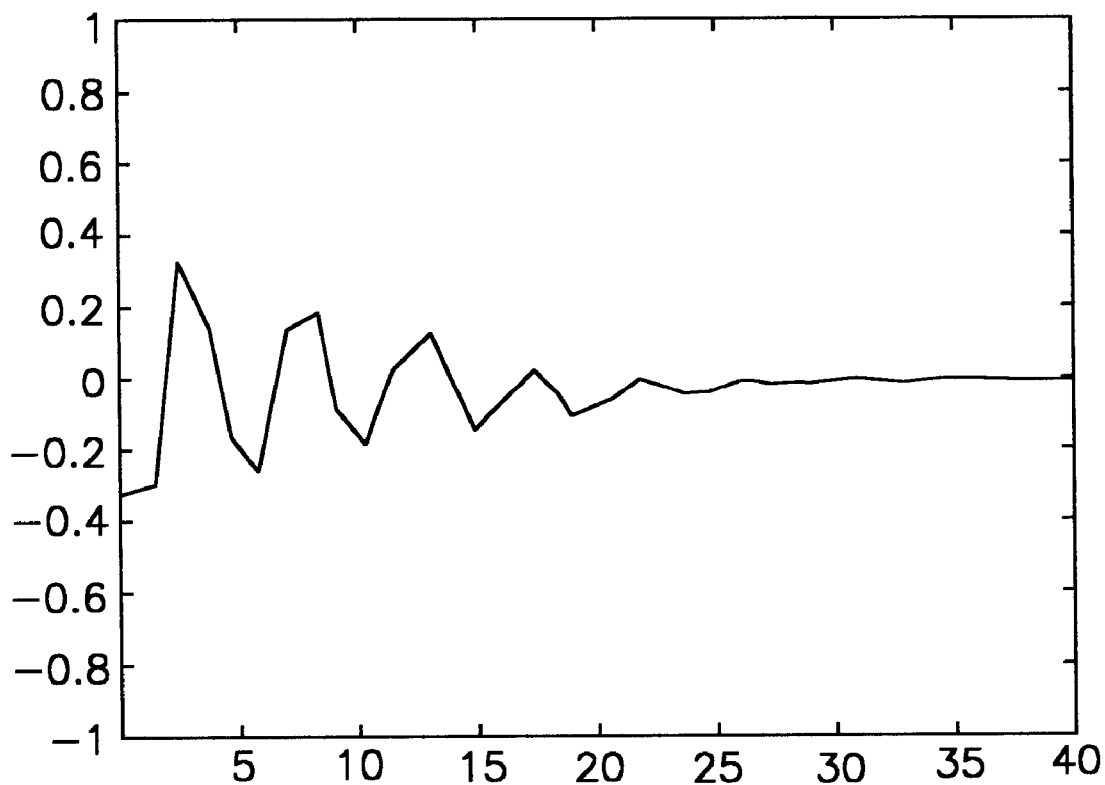
Figure 8:
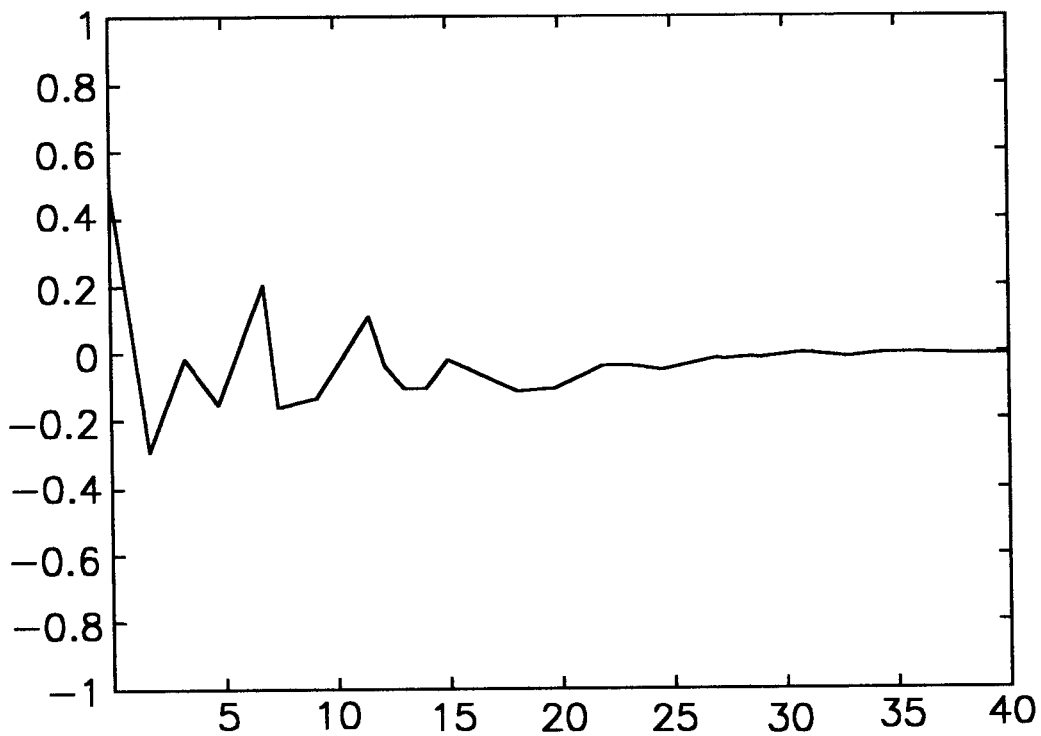

Proposed herein are two alternative initialization schemes, illustrated respectively in FIGS. 4a and 4b. In both initialization schemes, one forms the vector X from the observations $X_1(t) \ldots X_D(t)$ and one estimates the $P_A D \times P_A D$ matrix $E(XX^T)$. To ensure the block-Toeplitz structure of $E(XX^T)$ in spite of the finite length of the data, one may smooth the estimation of $E(XX^T)$ by averaging all the blocks spanning along a same diagonal.

A first initialization procedure (number 1) in accordance with at least one embodiment of the present invention is summarized in FIG. 4a. It involves computation of the transform $\Gamma_1$ as the multichannel linear prediction filters (by using for example the multichannel Levinson algorithm) and of the transform $\Gamma_2$ as the transform diagonalizing the covariance matrix of the prediction error at order $P_A$. The initial unmixing filters are estimated as the combined transform $\Gamma_1 \Gamma_2$. The initial unmixing filters are applied to the observations to recover initial sources. The density parameters are initialized by applying an EM procedure to the initially recovered sources, following the conventional ML estimation scheme in Gaussian Mixture Modeling.

A second initialization procedure (number 2) in accordance with at least one embodiment of the present invention is summarized in FIG. 4b. It does not require one to explicitly compute the transform $\Gamma_1$. Instead, it requires one to compute the prediction error data output by the prediction filters at order $P_A$. The prediction error can be efficiently computed using a reflection coefficient estimation method instead of using the Levinson algorithm (the reflection coefficient estimation methods have a lower computational cost than the Levinson algorithm (chapter 15 in Marple, supra). The transform $\Gamma_2$ is estimated as a whitening transform of the prediction error data. The CICA algorithm is applied to the prediction error data, instead of the data actually observed at the output of the sensors. Besides, the CICA algorithm is applied by initializing the unmixing matrix A(0) with $\sigma_2$ and by initialing the unmixing matrices A(1) . . . A($P_A$−1) with D×D matrices equal to zero matrices. The density parameters are initialized by applying an EM procedure to the initially recovered sources, following the conventional ML estimation scheme in Gaussian Mixture Modeling. The advantage of the initialization scheme 2 is to enhance the computational efficiency of the algorithm since:

computing the prediction error data requires fewer operations than computing the linear prediction coefficients, the CICA algorithm is ran on prediction error data that contain fewer time correlations than the actually observed data.

Besides, the initialization scheme 2 allows one to enlarge the search space to a subspace of the space of filters of length up to $2P_A$ (this subspace including the space of filters of length up to $P_A$) with no increase of the computational cost. This results from the fact that the filters eventually output by the procedure are a cascade of the initial filters of length $P_A$ and of the filters estimated on the pre-processed data by the CICA algorithm which are of length $P_A$ also. Note that in this alternative scheme, the initial filters and the filters estimated by the CICA algorithm on the pre-processed data could be of lengths respectively $p_1$ and $p_2$ with $P_1 \neq P_2$. In that case, the initialization scheme 2 allows one to explore a subspace of the space of filters of length up to $P_1+P_2$ (this subspace including the space of filters of length up to $p_2$).

The disclosure now turns to the estimation of the length of unmixing filters.

In the initialization schemes explained in section 5.2, it is assumed that the length $P_A$ of the unmixing filters is known. In practice, $P_A$ needs only to be an upper bound on the length of the filters since the unnecessary filter coefficients should converge towards zero when applying the algorithm. However, the upper bound should not be too high in order to maintain the algorithmic complexity to a manageable level. The value of $P_A$ a can be selected in the same way as the order of an autoregressive model is selected in autoregressive spectral estimation. Several model orders are postulated. Based on these, one computes some error criterion that indicates which model order to choose (chapter 8 in Marple, supra). Various criteria have been proposed as objective functions for model order selection. Experiments have been carried out with the multichannel version of the Akaike Information Criterion (AIC) (chapter 15 in Marple, supra). The selection of the length of the unmixing filters during the initialization scheme is illustrated in FIGS. 4a and 4b. At each recursion of the estimation algorithm of either the linear prediction coefficients (FIG. 4a) or of the prediction error (FIG. 4b), one may preferably compute the value of the AIC function. The model order which is selected is the value $P_A$ for which the AIC function is minimal.

Figure 3:
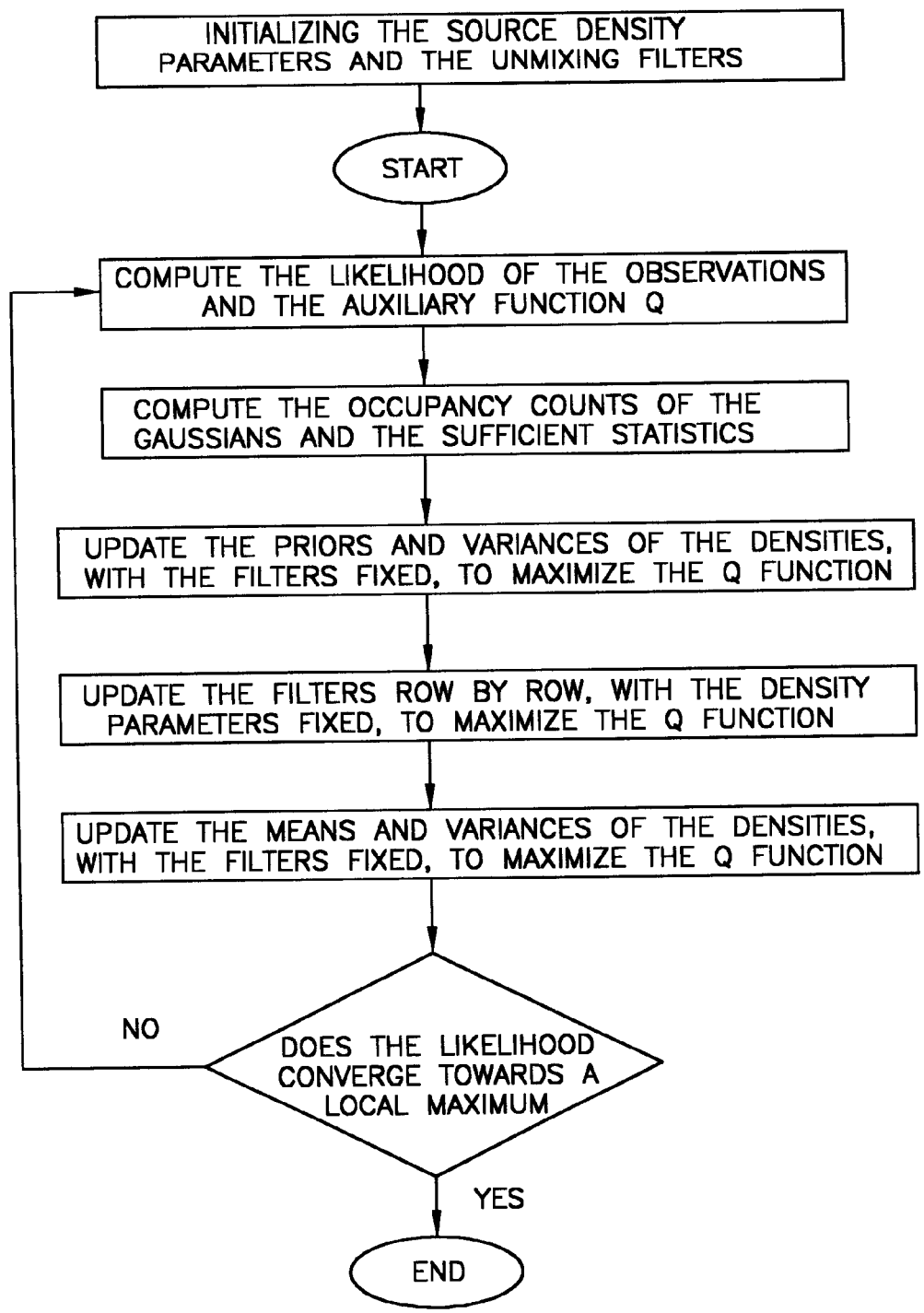
FIG. 3 gives an overview of a CICA algorithm.

A summary of an algorithm in accordance with at least one presently preferred embodiment of the present invention is shown in FIG. 3. The unmixing filters and their length, as well as the density parameters, are initialized following either one of the two schemes (1 and 2) described hereabove and summarized in FIGS. 4a and 4b. Then each iteration of the algorithm preferably includes the following steps:

Step 0 compute the likelihood of the observations,

Step 1 for each Gaussian component i of each source $Y_d$, and for each time index t, compute the occupancy probabilities (i)dj(t).

Step 2 for each Gaussian component i of each source $Y_d$, and for all values of (p,p') between 0 and $P_A$−1, compute the following sufficient statistics:

$$sum_{d,i} = \sum_{t=1}^{T} \omega_{d,i}(t)$$

$$sumX_{d,i}(p) = \sum_{t=1}^{T} \omega_{d,i}(t)X(t-p)$$

$$sumXX_{d,i}(p, p') = \left[\sum_{t=1}^{T} \omega_{d,i}(t)X(t-p)X^T(t-p')\right] - \frac{sumX_{d,i}(p)sumX_{d,i}^T(p')}{sum_{d,i}}$$

Step 3 for each Gaussian component i of each source $Y_d$, reestimate the priors and the variances maximizing the auxiliary function Q according to equations (7) and (9). Equations (7) and (9) can be rewritten as functions of the sufficient statistics as:

$$\pi_{d,i} = \frac{sum_{d,i}}{T}$$

$$\sigma_{d,i}^2 = \frac{\sum_{p,p'=0}^{P_A-1} a_d(p)sumXX_{d,i}(p, p')a_d(p')^T}{sum_{d,i}}$$

Step 4 for each row d, for all values of (p, p') between 0 and $P_A$−1, compute the matrices:

$$G_d(p, p') = \sum_{i=1}^{Id} \frac{1}{\sigma_{d,i}^2} sumXX_{d,i}(p, p')$$

solve the quadratic equation (1) by selecting the root β maximizing the auxiliary function Q as explained hereabove in connection with the derivation of EM estimation equations, reestimate the row $a^d(0)$ according to equation (12), for all values P of between 1 and $P_A$−1, reestimate the row $a^d(p)$ according to equation (10), normalize the row vector $[a_d(0) \ldots a_d(p) \ldots a_d(P_A-1)]$ so that its norm equals 1, for each Gaussian component 1 of the $d^{th}$ source, reestimate the mean and variance parameters maximizing the auxiliary function Q according to equations (8) and (9). Equations (8) and (9) can be rewritten as functions of the sufficient statistics as:

$$\mu_{d,i} = \frac{\sum_{p=0}^{P_A-1} a_d(p) sumX_{d,i}(p)}{sum_{d,i}}$$

$$\sigma_{d,i}^2 = \frac{\sum_{p,p'=0}^{P_A-1} a_d(p) sumX_{d,i}(p,p') a_d(p')^T}{sum_{d,i}}$$

Step 5 compute the improvement of the likelihood of the observations; if the improvement is above a prespecified threshold, then go to Step 1, otherwise exit the algorithm.

The algorithm proposed herein may best be used with either one of the two alternative initialization schemes discussed heretofore. Besides, the incremental version of the EM algorithm could be used, instead of the batch version shown herein, in order to further speed up the convergence of the algorithm.

The disclosure now turns to an overview of experimentation that was carried out.

Figure 9:
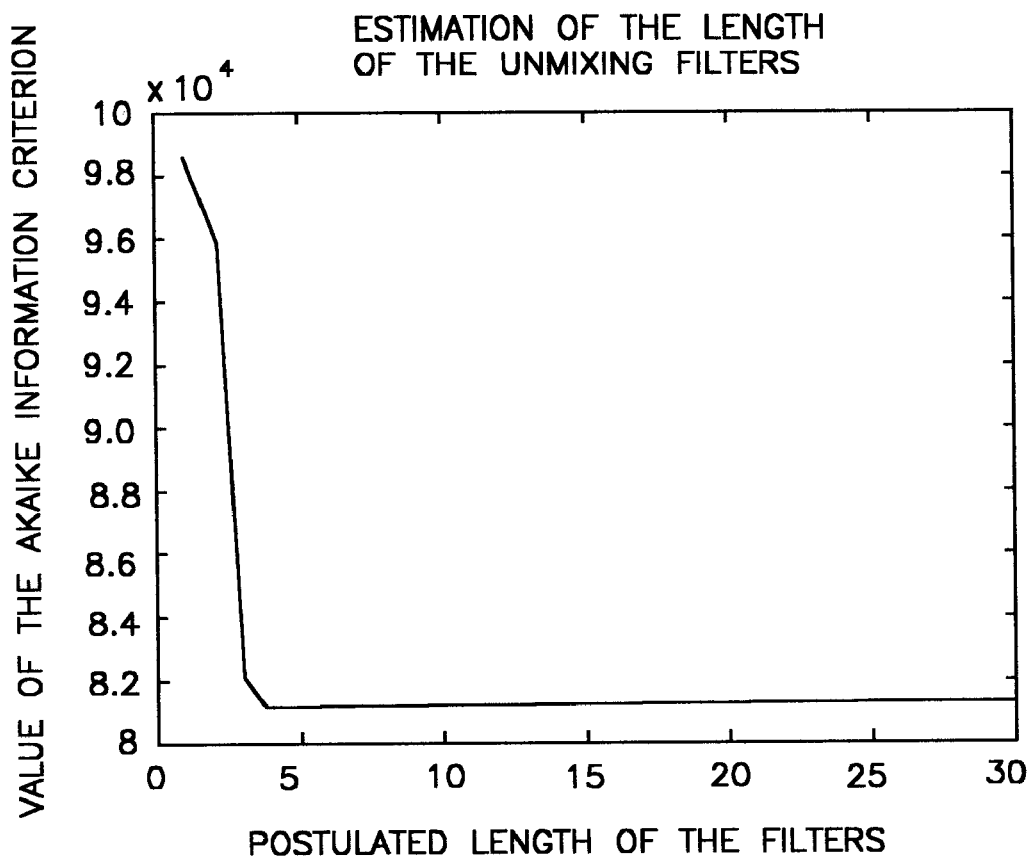
FIG. 9 illustrates the estimation of the length of unmixing filters used in experiments.
Figure 10:
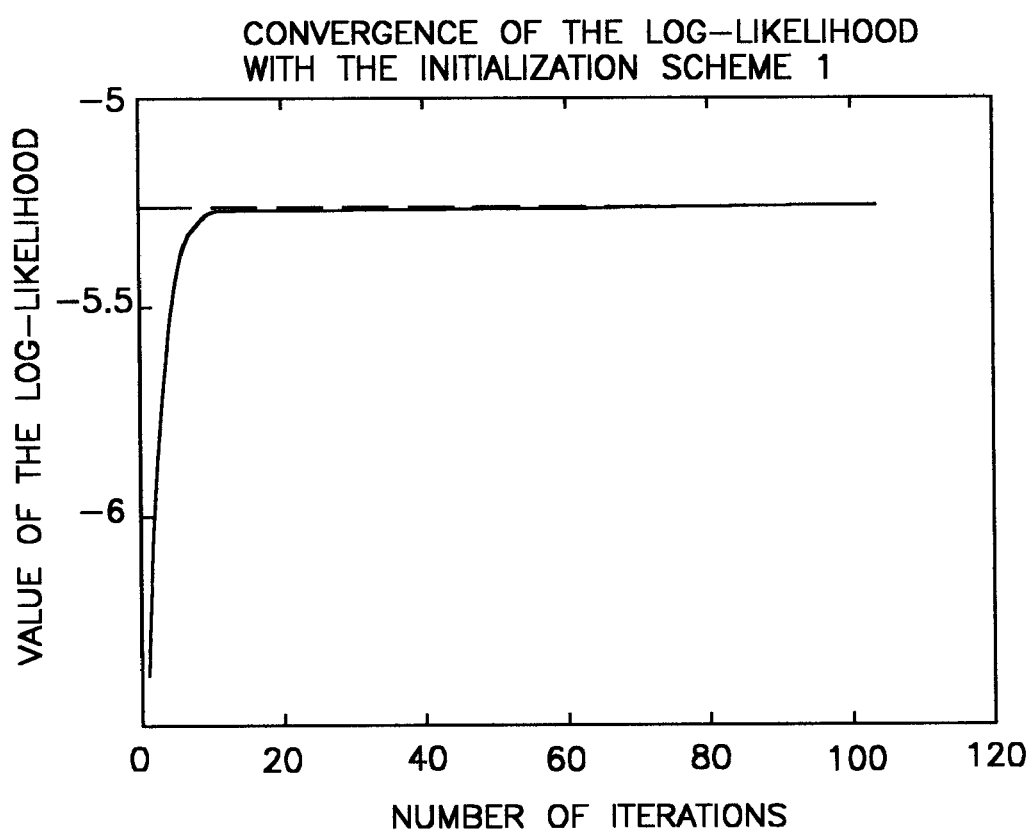
FIG. 10 shows the convergence of the log-likelihood of observations in experiments.
Figure 11:
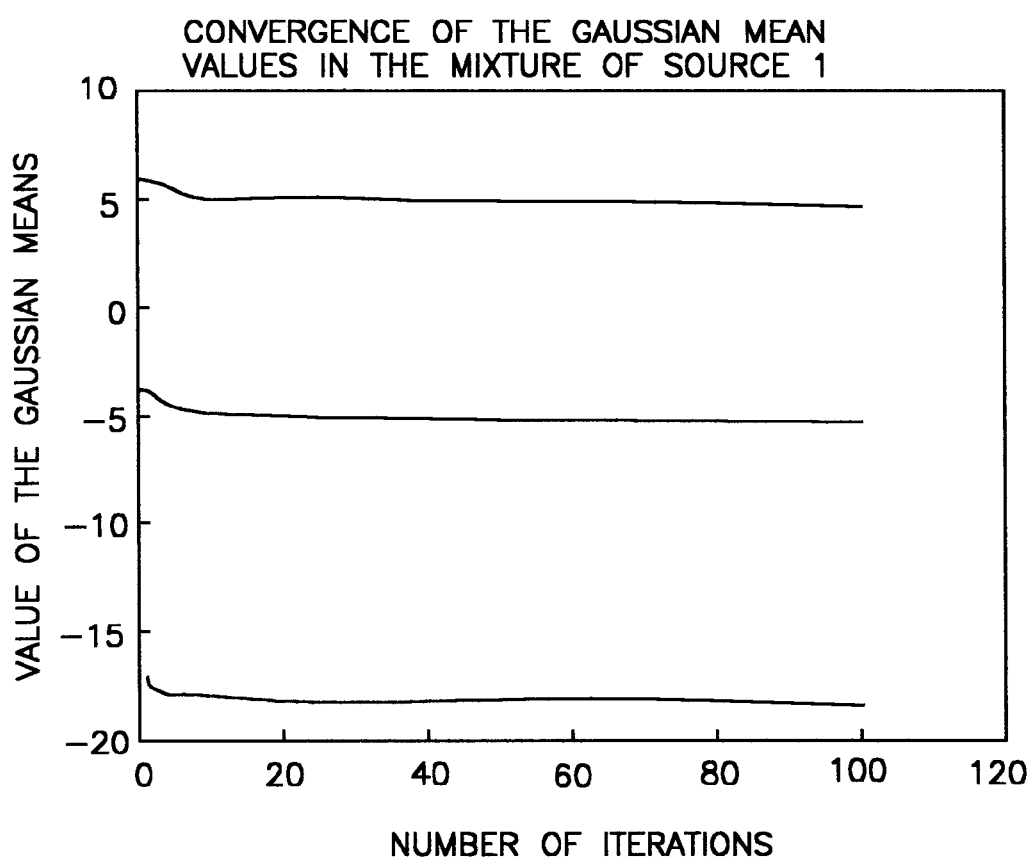
FIGS. 11 through 16 show the convergence of source density parameters in experiments.
Figure 12:
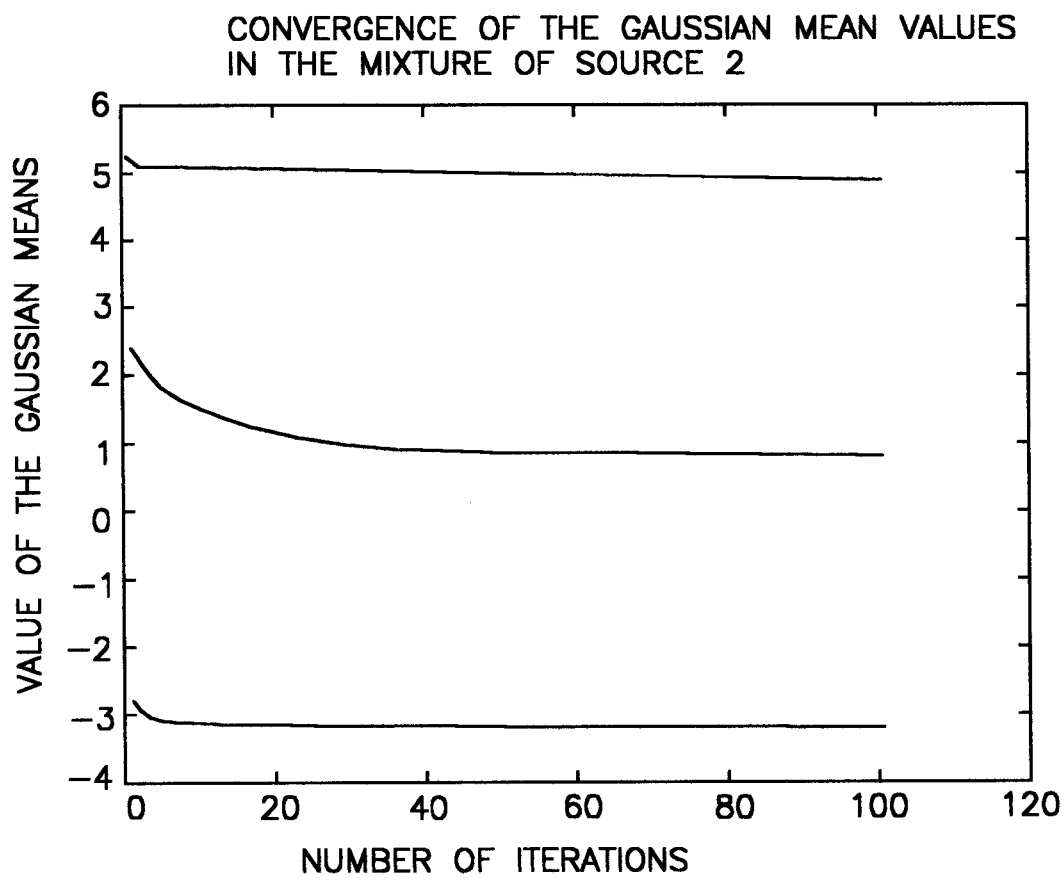
Figure 13:
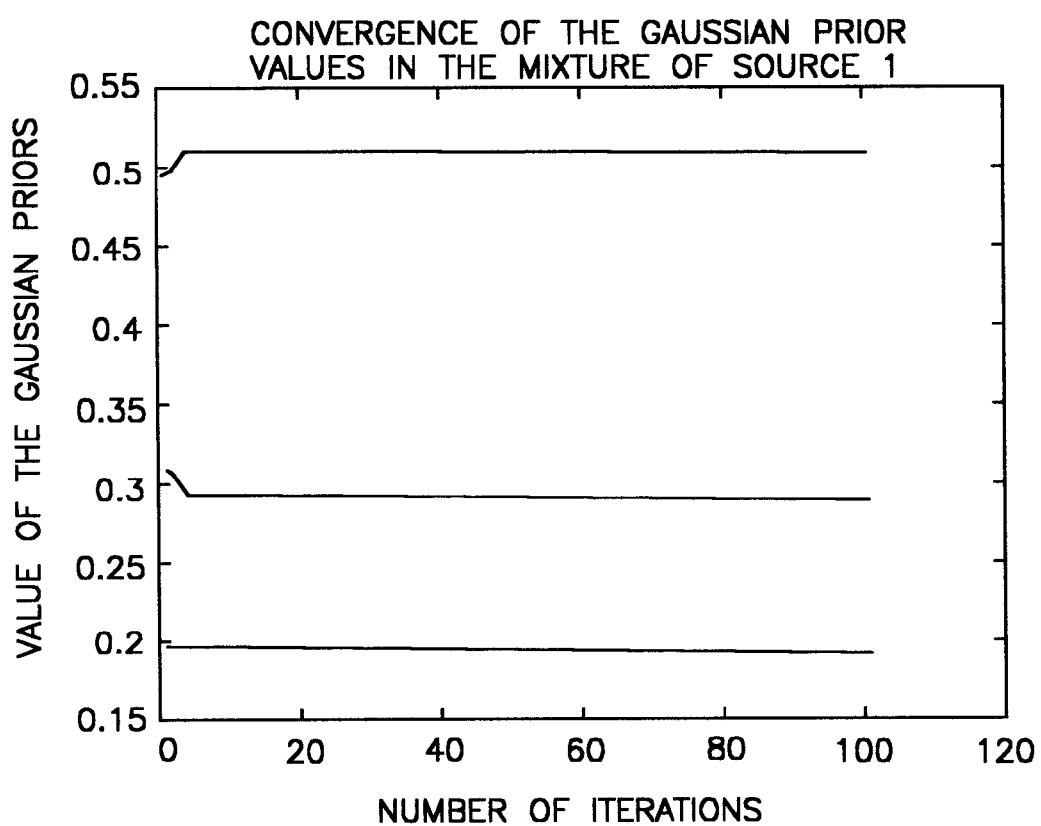
Figure 14:
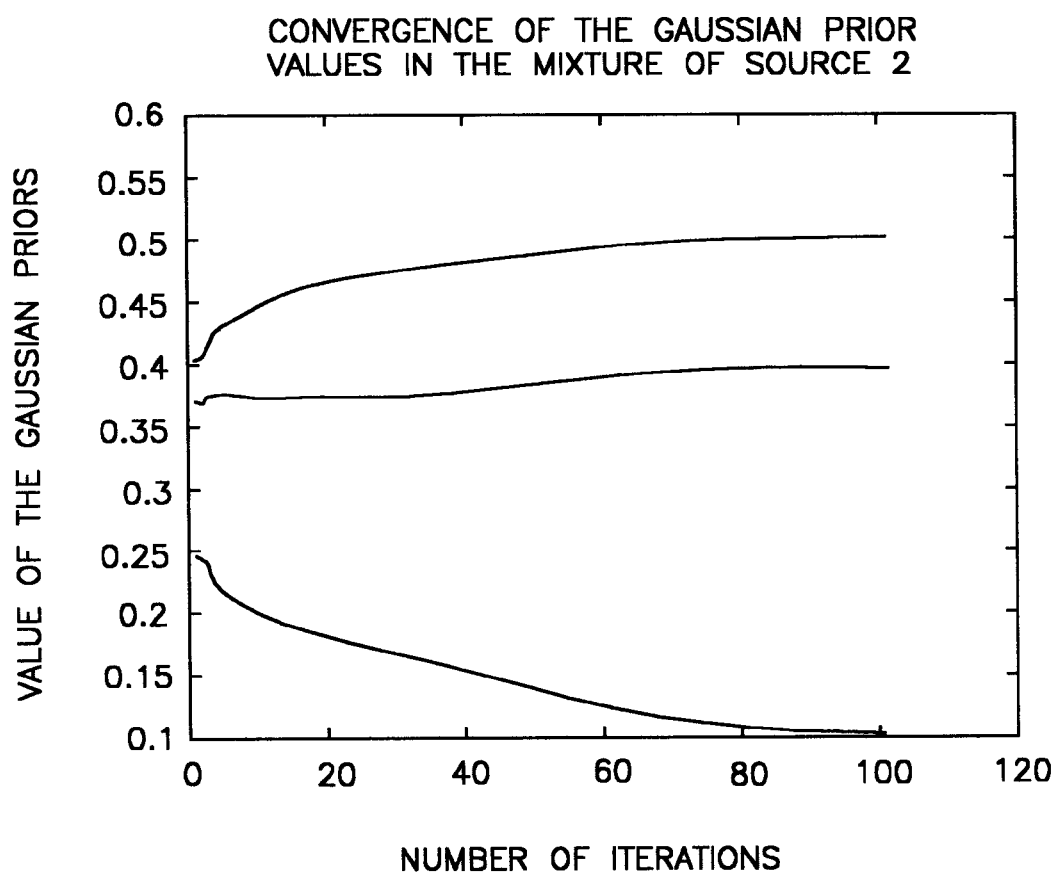
Figure 15:
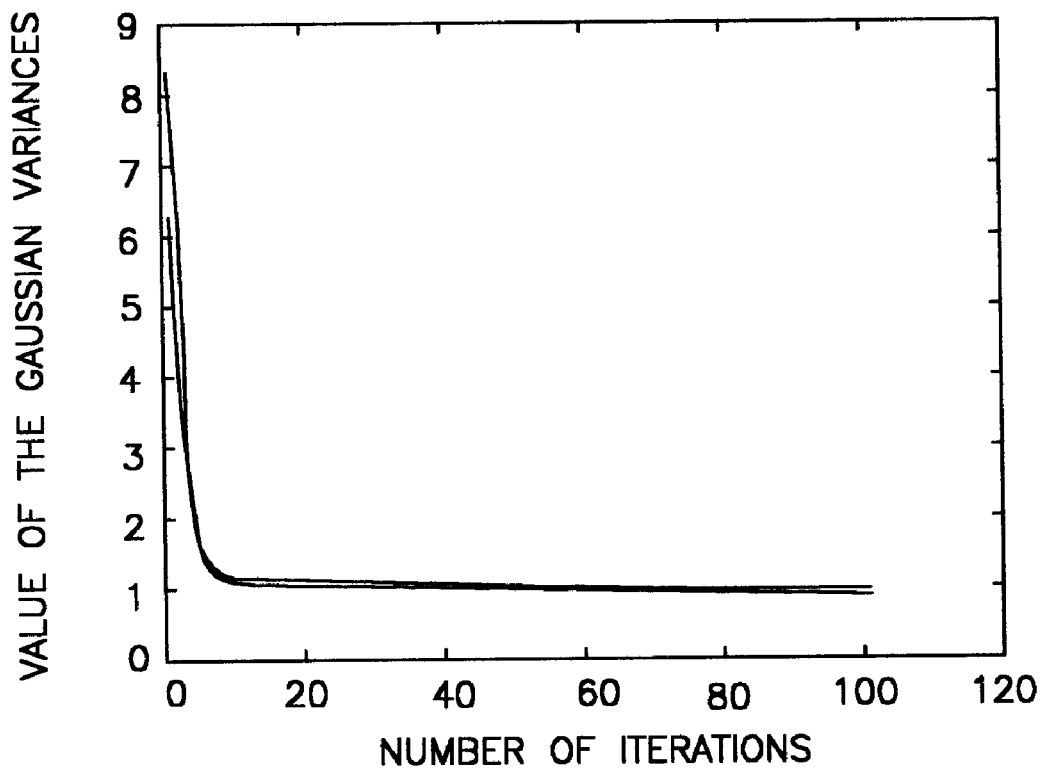
Figure 16:
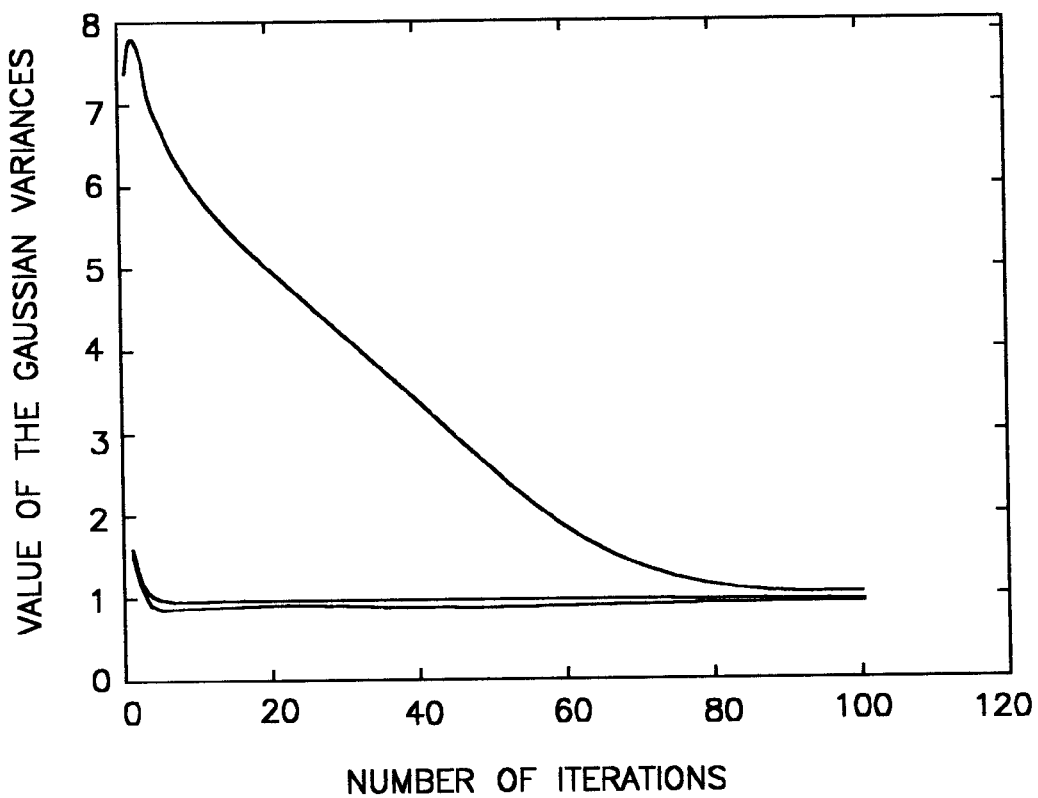

The aim of the experiments was to assess the performance of the EM solution together with the initialization schemes. Therefore, all experiments were conducted on artificial data which were generated so as to strictly comply with the CICA modeling assumptions. The source data were generated according to some known mixture of Gaussian densities. They were mixed with a matrix of filters selected so that one could estimate off line the length of the inverse filters and the unmixing matrix of filters. The procedure to select the mixing matrix of filters and to compute the unmixing matrix is explained below. The experiments thus involved:

estimating the length of the unmixing filters following the scheme described hereabove in connection with estimating the length of unmixing filters, and in initializing the unmixing filters and density parameters using either one of the two initialization schemes. FIG. 9 illustrates the selection of the length of the unmixing filters.

estimating the inverse filters and the source densities (by deciding a priori the number of components in each mixture) by applying the algorithm described hereabove. FIG. 10 shows the convergence of the log likelihood function against the number of iterations for the initialization scheme 1.

evaluating the performance of the algorithm by comparing the estimated unmixing filters with the known inverse filters, and by comparing the estimated densities with the known densities. The FIGS. 11 to 16 show the convergence of each source density parameter against the number of iterations.

Herebelow is an explanation of the scheme devised to select the mixing filters in the experiments and to compute off line estimates of the unmixing filters. The point of computing off line estimates of the unmixing filters was to have a reference solution against which to evaluate the unmixing filters blindly estimated by the algorithm. Besides, this scheme guarantees that the mixing filters are complying with the following requirements used in the algorithm:

the unmixing filters must be of finite length, and
the mixing matrix B(0) is full ran The scheme devised to select the filters is inspired by the matricial equation (3), together with its inverse counterpart:

$$\begin{bmatrix} X(1) \\ X(2) \\ \cdots \\ X(t) \\ \cdots \\ \cdots \\ X(T) \end{bmatrix} = \begin{bmatrix} B(0) & 0_D & \cdots & & & & \\ B(1) & B(0) & 0_D & \cdots & & & \\ & & \cdots & 0_D & B(P_B-1) & \cdots & B(0) & 0_D & \cdots \\ & & & & \cdots & 0_D & B(P_B-1) & \cdots & B(0) & 0_D \\ & & & & & \cdots & 0_D & B(P_B-1) & \cdots & B(0) \end{bmatrix} \begin{bmatrix} \dot{Y}(1) \\ \dot{Y}(2) \\ \cdots \\ \dot{Y}(t) \\ \cdots \\ \cdots \\ \dot{Y}(T) \end{bmatrix} \quad (14)$$

These equations suggest that the length $P_A$ of the inverse filters as well as the unmixing matrices $A(P_A-1) \ldots A(0)$ can be obtained by inverting the TD×TD mixing matrix in (14), since the inverse matrix would correspond to the TD×TD unmixing matrix in (3). Assuming that T is chosen such that $T > P_A$, the unmixing matrices $A(P_A-1) \ldots A(0)$ can be estimated by averaging the D×D blocks along the diagonals of the inverse matrix, And the value of $P_A$ is estimated from the number of matrices A(p) having coefficients of significant value.

In order to select filters for the experiments, this procedure was applied to the matrix of filters with the impulse response if $B_{11}(p)$, $B_{12}(p)$, $B_{21}(p)$, $B_{22}(p)$ ($P_B=30$) plotted respectively on FIGS. 5, 6, 7 and 8.

The inverse matrix of filters to be estimated with the algorithm has the impulse responses $A_{11}(p)$, $A_{12}(p)$, $A_{21}(p)$, $A_{22}(p)$ ($P_A=4$) (after normalization of the rows):

$$A(0) = \begin{bmatrix} 0.600 & -0.432 \\ 0.351 & 0.757 \end{bmatrix}$$

$$A(1) = \begin{bmatrix} 0.300 & 0.173 \\ 0.350 & 0.253 \end{bmatrix}$$

$$A(2) = \begin{bmatrix} 0.180 & -0.518 \\ -0.246 & 0.202 \end{bmatrix}$$

$$A(3) = \begin{bmatrix} -0.060 & 0.173 \\ -0.070 & 0.101 \end{bmatrix}$$

$$A(p) = \begin{bmatrix} 0 & 0 \\ 0 & 0 \end{bmatrix} \text{ for } p \geq 4$$

These values serve as the reference value against which to evaluate the accuracy of the filters blindly estimated by the algorithm proposed herein.

Test data were generated simulating two independent sources with mixtures of Gaussians densities having 3 components. To simulate the first source, 10,000 points were generated with the density parameters:

$(\pi_{11}, \pi_{12}, \pi_{13})=(-18, -5, 5)$ $(\mu_{11}, \mu_{12}, \mu_{13})=(0.2, 0.3, 0.5)$ $(\sigma_{11}, \sigma_{12}, \sigma_{13})=(1,1,1)$ And to simulate the second source, 10,000 points were generated with the density parameters:

$(\pi_{21}, \pi_{22}, \pi_{23}) = (-3, 1, 5)$ $(\mu_{21}, \mu_{22}, \mu_{23}) = (0.4, 0.1, 0.5)$ $(\sigma_{21}, \sigma_{22}, \sigma_{23}) = (1, 1, 1)$ Results from the experiments will now be discussed.

To evaluate an upper bound on the length of the unmixing filters, the scheme outlined hereinabove in connection with estimating the length of the unmixing filters was applied. FIG. 9 shows the values of the AIC function against the postulated length of the filters. The AIC function is minimal for a filter length of 4, which corresponds to the actual length of the unmixing filters in our experiments. However, $P_A$ was set to the upper bound value 10 in order to demonstrate the ability of the algorithm to properly estimate the unnecessary matrices (i.e. it was expected that the final estimates of A(5) ... A(9), after convergence of the algorithm, would equal 0). Taking equal to $P_A$ equal to 10, the algorithm was initialized with either one of the two alternative procedures described hereabove (and illustrated in FIGS. 4a and 4b).

FIG. 10 shows the log likelihood of the observations computed with the parameters obtained at each iteration for the initialization scheme 1 (described in FIG. 4a). The loglikelihood value corresponding to the actual unmixing matrix and density parameters is the dotted line. The algorithm proposed herein allows convergence towards the desired maximum: the curve converges towards the log likelihood computed with the actual parameters.

Even though the length of the unmixing filters was properly estimated to be 4 during the initialization, the algorithm was run by allowing filters of up to a length of 10. After convergence the estimated unmixing matrices A(p) were:

$$A(0) = \begin{bmatrix} 0.602 & -0.429 \\ 0.353 & 0.756 \end{bmatrix}$$

$$A(1) = \begin{bmatrix} -0.299 & 0.174 \\ 0.352 & 0.253 \end{bmatrix}$$

$$A(2) = \begin{bmatrix} 0.179 & -0.519 \\ -0.247 & 0.199 \end{bmatrix}$$

$$A(3) = \begin{bmatrix} -0.062 & 0.169 \\ -0.072 & 0.097 \end{bmatrix}$$

$$A(p) = \begin{bmatrix} 0 & 0 \\ 0 & 0 \end{bmatrix} \text{ for } p \geq 4$$

These estimates are extremely close to the normalized values of the reference unmixing filters that had been estimated off line by inverting the mixing matrix:

$$A(0) = \begin{bmatrix} 0.600 & -0.432 \\ 0.351 & 0.757 \end{bmatrix}$$

$$A(1) = \begin{bmatrix} -0.300 & 0.173 \\ 0.350 & 0.253 \end{bmatrix}$$

$$A(2) = \begin{bmatrix} 0.180 & -0.518 \\ -0.246 & 0.202 \end{bmatrix}$$

$$A(3) = \begin{bmatrix} -0.060 & 0.173 \\ -0.070 & 0.101 \end{bmatrix}$$

$$A(p) = \begin{bmatrix} 0 & 0 \\ 0 & 0 \end{bmatrix} \text{ for } p \geq 4$$

FIGS. 11 to 16 show the convergence of the estimated Gaussian density parameters of the first and second sources when using the initialization scheme 1. In all FIGS. 11–16, convergence takes place towards the desired actual value of the mean, prior and variances.

Figure 17:
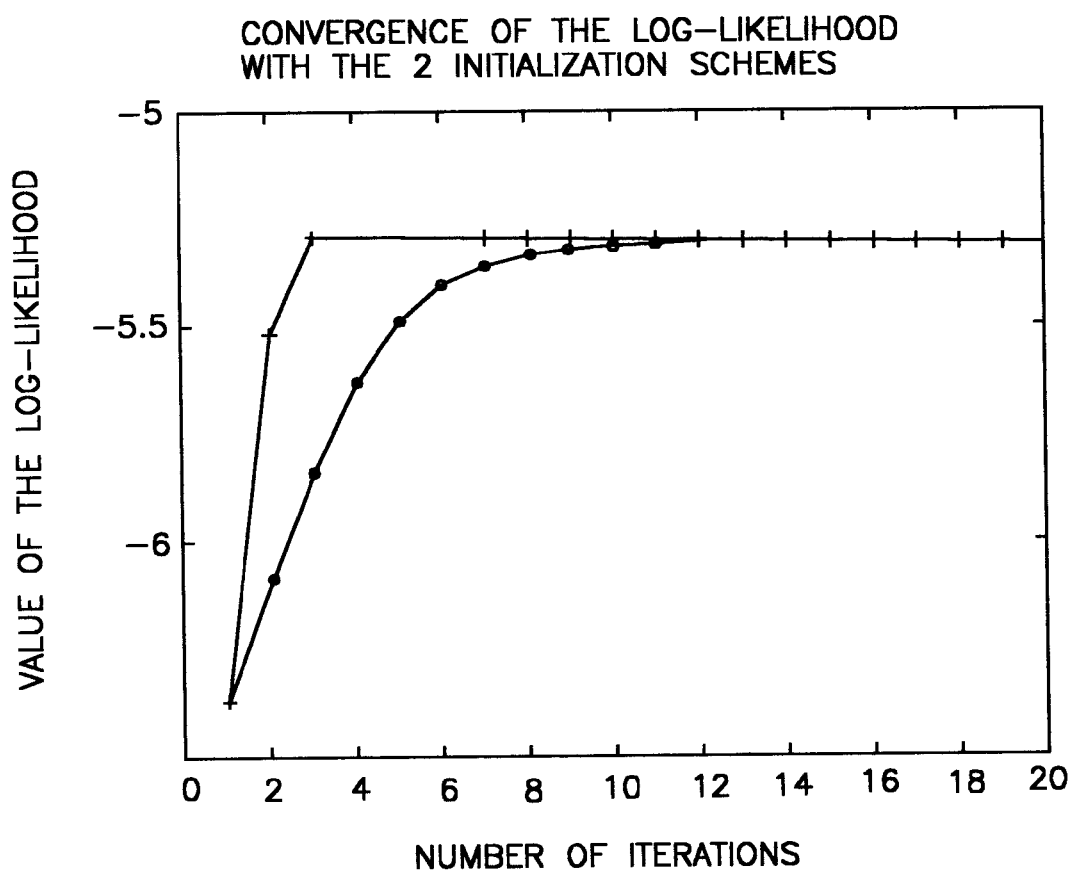
FIG. 17 illustrates a comparison of the convergence of the log-likelihood for two initialization schemes included in the invention.

FIGS. 17 compares the convergence of the loglikelihood for the initialization schemes 1 and 2. Whereas it takes about 15 iterations to reach convergence with the initialization scheme 1 (described on FIG. 4a), it takes only about 8 iterations with the initialization scheme 2 (described on FIG. 4b).

It should be appreciated that there are several conceivable uses for the methods and arrangements discussed herein. Some non-restrictive examples of such uses are: speaker separation in speech recognition (e.g. a "cocktail-party problem", or cross-talk removal in multichannel communications); speech enhancement with multiple microphones (e.g., speech mixed with music/noise in a car); multipath channel identification and equalization in digital communication; the discovery of independent sources in biological signals (for example EEG); the direction of arrival estimation in sensor arrays; and many other conceivable applications in which algorithms of the type disclosed and encompassed herein may be particularly pertinent or useful.

It is to be understood that the present invention, in accordance with at least one presently preferred embodiment, includes an initializing arrangement which initializes at least one parameter, an input arrangement which obtains a set comprising at least one observation, a likelihood computing arrangement which computes the likelihood of the at least one observation and of an auxiliary function, a maximizing arrangement which maximizes the auxiliary function, and an ascertaining arrangement which ascertains whether the likelihood of the at least one observation converges. Together, the initializing arrangement, input arrangement, likelihood computing arrangement, maximizing arrangement and ascertaining arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating blind source separation in convolutive independent component analysis, said method comprising the steps of:

initializing at least one parameter;

obtaining a set comprising at least one observation from at least one targeted source signal, irrespective of whether a priori knowledge is available with regard to the at least one targeted source signal;

computing the likelihood of the at least one observation and of an auxiliary function, the auxiliary function representing a conditional expectation of the log-likelihood of complete source data, the complete source data including at least one gaussian component associated with each targeted source signal;

maximizing the auxiliary function; and ascertaining whether the likelihood of the at least one observation converges.

2. The method according to claim 1, wherein said ascertaining step comprises ascertaining whether the likelihood of the at least one observation converges towards a local maximum.

3. The method according to claim 1, further comprising the step of repeating said computing, maximizing and ascertain steps if the likelihood of the at least one observation is not ascertained as converging.

4. The method according to claim 3, wherein said repeating step comprises successively repeating said computing, maximizing and ascertaining steps until the likelihood of the at least one observation is ascertained as converging.

5. The method according to claim 1, wherein said maximizing step comprises reestimating at least one parameter.

6. The method according to claim 5, wherein said reestimating step comprises at least one of the following steps:

reestimating priors and variances;

updating at least one unmixing filter; and reestimating means and variances.

7. The method according to claim 6, wherein said reestimating step comprises all of said steps of:

reestimating priors and variances;

updating at least one unmixing filter; and reestimating means and variances.

8. The method according to claim 7, wherein said step of reestimating priors and variances comprises updating priors and variances of densities as at least one un-mixing filter is fixed.

9. The method according to claim 7, wherein said step of updating at least one un-mixing filter comprises updating at least one un-mixing filter row by row as density parameters are fixed.

10. The method according to claim 7, wherein said step of reestimating means and variances comprises updating means and variances of densities as at least one unmixing filter is fixed.

11. The method according to claim 1, wherein said initializing step comprises initializing source density parameters and at least one un-mixing filter.

12. The method according to claim 1, wherein said initializing step comprises time-decorrelating the at least one observation via computing at least one linear prediction coefficient.

13. The method according to claim 12, wherein said initializing step further comprises spatially decorrelating the at least one observation via diagonalizing a covariance matrix.

14. The method according to claim 1, wherein said initializing step comprises time-decorrelating the at least one observation via computing error prediction data with a reflection coefficient estimation method.

15. The method according to claim 14, wherein said initializing step further comprises spatially decorrelating the at least one observation via diagonalizing a covariance matrix.

16. The method according to claim 1, wherein said initializing step comprises the step of estimating the length of at least one un-mixing filter.

17. An apparatus for facilitating blind source separation in convolutive independent component analysis, said apparatus comprising:

an initializing arrangement which initializes at least one parameter;

an input arrangement which obtains a set comprising at least one observation from at least one targeted source signal, irrespective of whether a priori knowledge is available with regard to the at least one targeted source signal;

a likelihood computing arrangement which computes the likelihood of the at least one observation and of an auxiliary function, the auxiliary function representing a conditional expectation of the log-likelihood of complete source data, the complete source data including at least one gaussian component associated with each targeted source signal;

a maximizing arrangement which maximizes the auxiliary function; and an ascertaining arrangement which ascertains whether the likelihood of the at least one observation converges.

18. The apparatus according to claim 17, wherein said ascertaining arrangement is adapted to ascertain whether the likelihood of the at least one observation converges towards a local maximum.

19. The apparatus according to claim 17, wherein said maximizing arrangement is adapted to reestimate at least one parameter.

20. The apparatus according to claim 19, wherein said maximizing arrangement is adapted to perform at least one of the following steps:

reestimating priors and variances;

updating at least one unmixing filter; and reestimating means and variances.

21. The apparatus according to claim 20, wherein said maximizing arrangement is adapted to perform all of the following steps:

reestimating priors and variances;

updating at least one unmixing filter; and reestimating means and variances.

22. The apparatus according to claim 21, wherein said maximizing arrangement is, in reestimating priors and variances adapted to update priors and variances of densities as at least one un-mixing filter is fixed.

23. The apparatus according to claim 21, wherein said maximizing arrangement is, in updating at least one un-mixing filter, adapted to update at least one un-mixing filter row by row as density parameters are fixed.

24. The apparatus according to claim 21, wherein said maximizing arrangement is, in reestimating means and variances, adapted to update means and variances of densities as at least one unmixing filter is fixed.

25. The apparatus according to claim 17, wherein said initializing arrangement is adapted to initialize source density parameters and at least one un-mixing filter.

26. The apparatus according to claim 17, wherein said initializing arrangement is adapted time-decorrelate the at least one observation via computing at least one linear prediction coefficient.

27. The apparatus according to claim 26, wherein said initializing arrangement is adapted to spatially decorrelate the at least one observation via diagonalizing a covariance matrix.

28. The apparatus according to claim 17, wherein said initializing arrangement is adapted to time-decorrelate the at least one observation via computing error prediction data with a reflection coefficient estimation method.

29. The apparatus according to claim 28, wherein said initializing arrangement is adapted to spatially decorrelate the at least one observation via diagonalizing a covariance matrix.

30. The apparatus according to claim 17, wherein said initializing arrangement is adapted to estimate the length of at least one un-mixing filter.

31. A program storage device readable by machine, tangibly embodying a program of instructions executable by the machine to perform method steps for facilitating blind source separation in convolutive independent component analysis, said method comprising the steps of:

initializing at least one parameter;

obtaining a set comprising at least one observation from at least one targeted source signal, irrespective of whether a priori knowledge is available with regard to the at least one targeted source signal;

computing the likelihood of the at least one observation and of an auxiliary function, the auxiliary function representing a conditional expectation of the loglikelihood of complete source data, the complete source data including at least one gaussian component associated with each targeted source signal;

maximizing the auxiliary function; and ascertaining whether the likelihood of the at least one observation converges.

\* \* \* \* \*

UNITED STATES PATENT AND TRADEMARK OFFICE
CERTIFICATE OF CORRECTION

PATENT NO. : 6,622,117 B2  Page 1 of 1
DATED : September 16, 2003
INVENTOR(S) : Deligne et al.

It is certified that error appears in the above-identified patent and that said Letters Patent is hereby corrected as shown below:

Title page, Item [54] and Column 1, lines 1-3,
"EM ALGORITHM FOR CONVOLUTIVE INDEPENDENT COMPONENT ANALYSIS (CICA)" should read -- EM ALGORITHM FOR CONVOLUTED INDEPENDENT COMPONENT ANALYSIS (CICA) --

Signed and Sealed this

Ninth Day of December, 2003

JAMES E. ROGAN
*Director of the United States Patent and Trademark Office*